United States Patent [19]

Baggen et al.

[11] Patent Number: 5,048,003
[45] Date of Patent: Sep. 10, 1991

[54] METHOD OF AND DEVICE FOR RECORDING INFORMATION, RECORD CARRIER, DEVICE FOR READING THE RECORDED INFORMATION, AND ENCODING AND DECODING CIRCUIT FOR USE IN THE RECORDING AND READ DEVICE

[75] Inventors: Constant P. M. J. Baggen; Cornelis M. J. Van Uijen; Erik W. Gaal, all of Eindhoven, Netherlands

[73] Assignee: U.S. Philips Corporation, New York, N.Y.

[21] Appl. No.: 651,094

[22] Filed: Jan. 30, 1991

Related U.S. Application Data

[63] Continuation of Ser. No. 494,873, Feb. 8, 1990, abandoned, which is a continuation of Ser. No. 190,723, May 5, 1988, abandoned.

[30] Foreign Application Priority Data

Dec. 3, 1987 [NL] Netherlands .......................... 8702905

[51] Int. Cl.$^5$ ............................ G11B 5/76; G11B 5/09
[52] U.S. Cl. ......................................... 369/59; 360/40
[58] Field of Search ......................................... 369/59

[56] References Cited

U.S. PATENT DOCUMENTS

| | | | |
|---|---|---|---|
| 4,146,909 | 3/1979 | Beckenhauer et al. | 360/40 |
| 4,496,934 | 1/1985 | Furukawa | 360/40 |
| 4,502,036 | 2/1985 | Furukawa | 360/40 |
| 4,549,167 | 10/1985 | Kato et al. | 360/40 |
| 4,677,421 | 6/1987 | Taniyama et al. | 340/347 |

*Primary Examiner*—Vincent P. Canney
*Attorney, Agent, or Firm*—Leroy Eason

[57] ABSTRACT

A method is revealed for recording an information signal (Vi) on a record carrier (1). The information signal (Vi) is converted into code words (200), which comprise a variable number of bits of a first logic value ("1") and a variable number of bits of a second logic value ("0"). The number of successive bits of the first logic value ("1") is at least equal to P. The number of successive bits of the second logic value, situated between the bits of the first logic value, is at least equal to Q, Q being greater than P. A pattern of recording marks (8;54) corresponding to the code signal (Vc) is recorded on the record carrier (1) in such a way that bits of the first logic value ("1") are represented by recording marks (8;54). Moreover, an information recording device (FIG. 17), an information read device, and a decoding device (FIG. 18) are revealed.

16 Claims, 27 Drawing Sheets

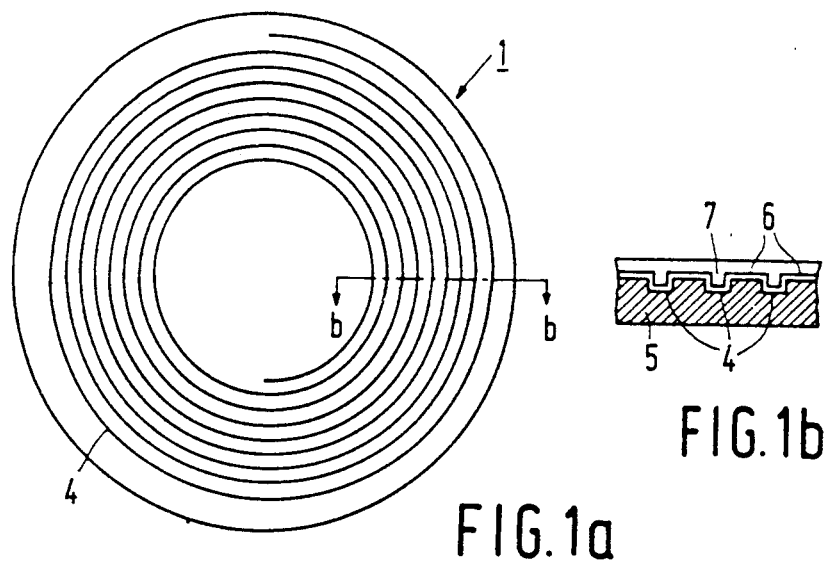
FIG.1b
FIG.1a
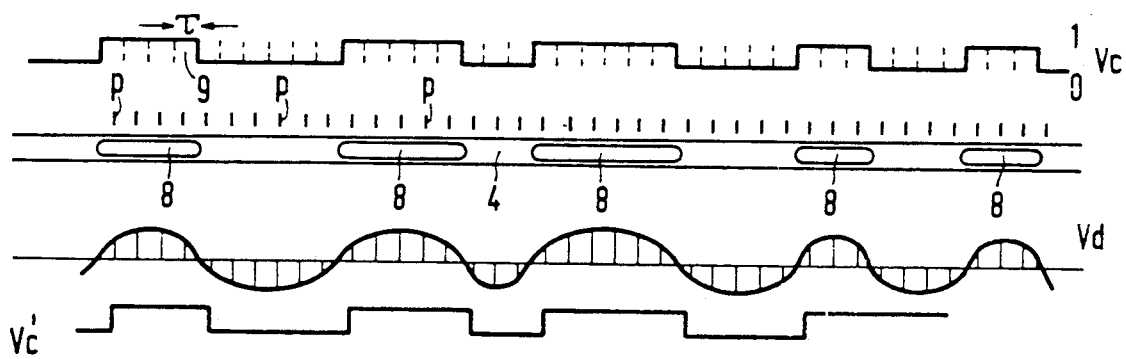
FIG.2
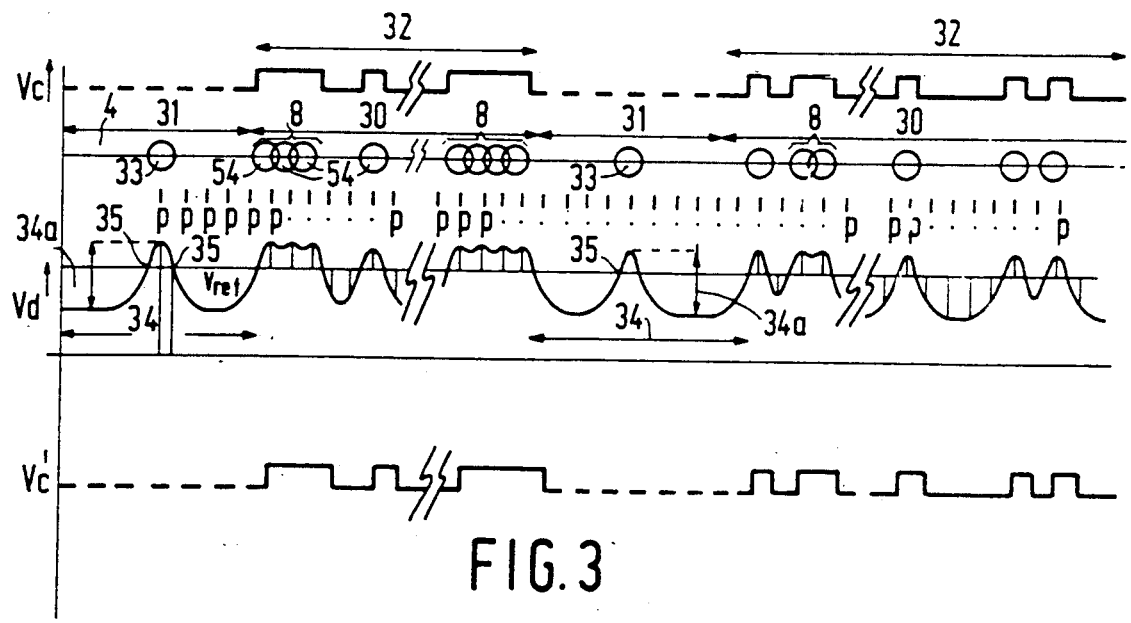
FIG.3

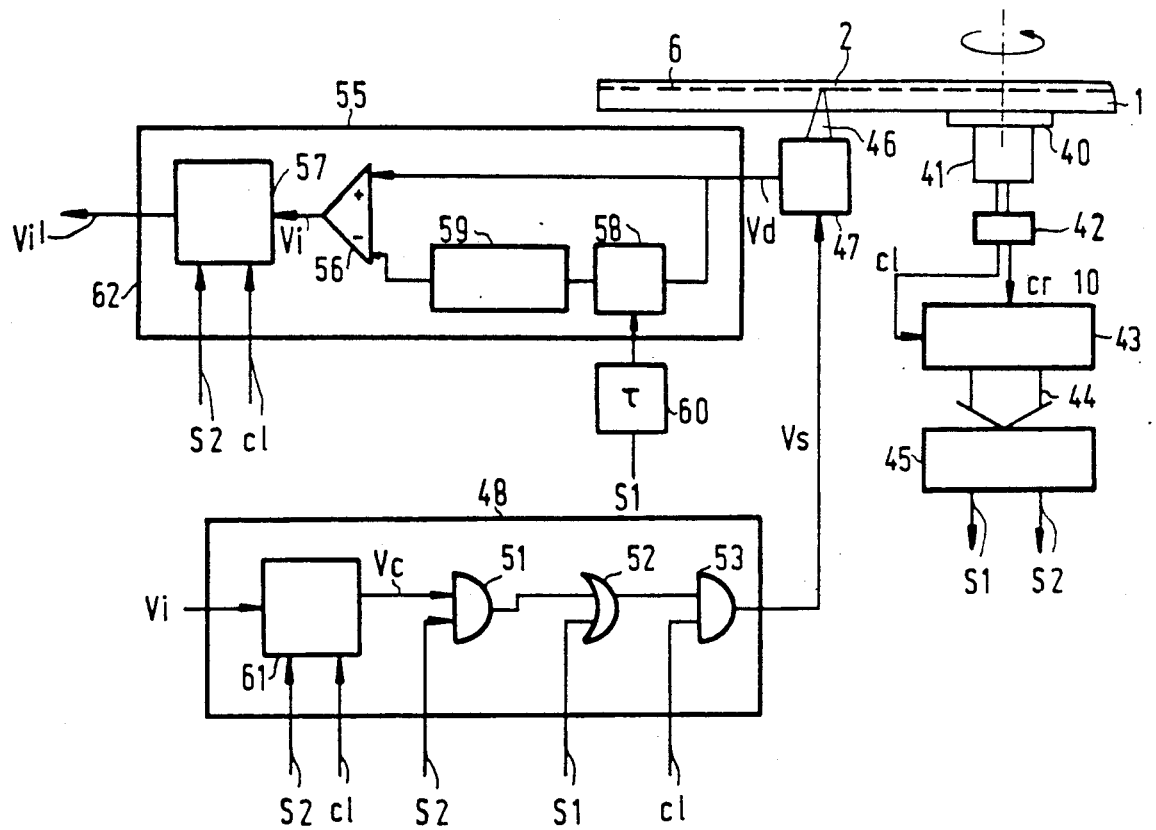
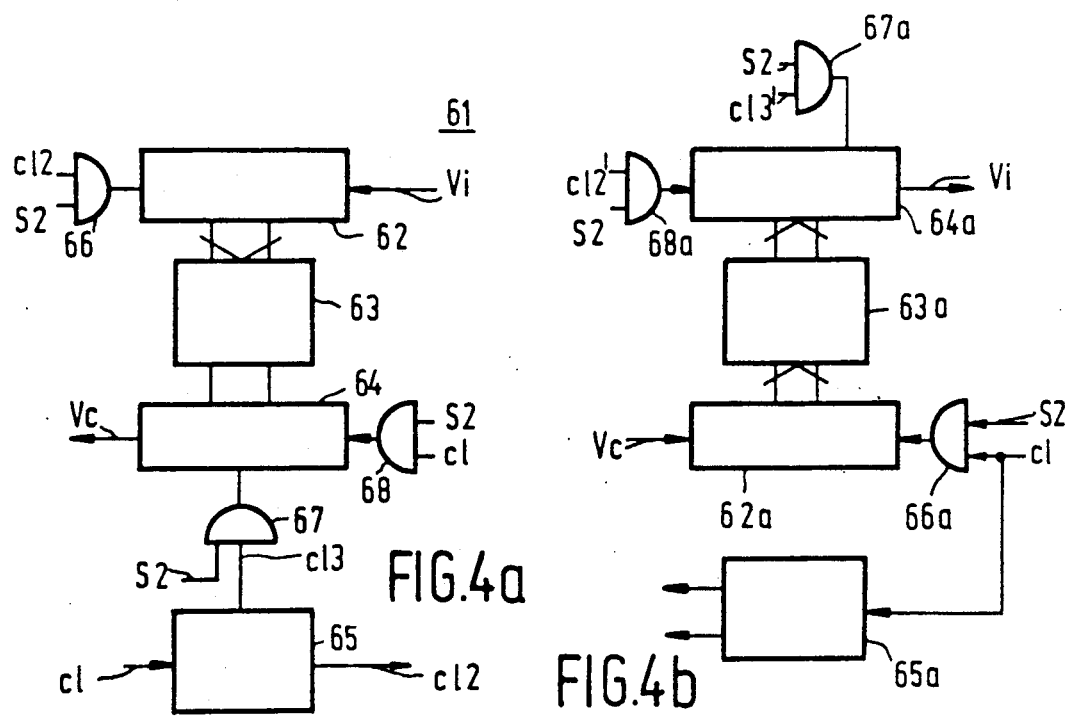
FIG.4
FIG.4a
FIG.4b

| IW | CW |
|---|---|
| 0 0 | 0 0 0 |
| 1 1 | 1 1 1 |
| 0 1 0 0 | 0 0 0 0 0 1 |
| 0 1 0 1 | 0 0 0 0 1 1 |
| 0 1 1 0 | 1 0 0 0 0 0 |
| 0 1 1 1 | 1 1 0 0 0 0 |
| 1 0 0 0 | 1 0 0 0 0 0 |
| 1 0 0 1 | 1 1 0 0 0 1 |
| 1 0 1 0 | 1 0 0 0 1 1 |
| 1 0 1 1 0 0 | 0 0 0 0 1 0 0 0 1 |
| 1 0 1 1 0 1 | 0 0 0 0 1 0 0 0 0 |
| 1 0 1 1 1 0 | 1 0 0 0 1 0 0 0 1 |
| 1 0 1 1 1 1 | 1 0 0 0 1 0 0 0 0 |

FIG. 14

| | IW1 | IW2 | IW3 | IW4 | IW5 | IW6 | IW7 |
|---|---|---|---|---|---|---|---|
| Vi | 0 0 | 1 0 1 1 0 0 | 0 1 1 1 | 1 1 | 0 1 1 0 | 1 1 | 0 0 |
| Vc | 000 | 000 010 001 | 110 000 | 111 | 100 000 | 111 | 000 |
| | CW1 | CW2 | CW3 | CW4 | CW5 | CW6 | CW7 |

FIG. 15

| IW | CW |
|---|---|
| 1 | 1 1 |
| 0 0 1 | 1 0 0 0 0 0 |
| 0 1 0 | 0 0 0 0 0 1 |
| 0 0 0 | 0 0 0 0 0 0 |
| 0 1 1 0 | 0 0 0 0 0 0 0 1 |
| 0 1 1 1 | 1 0 0 0 0 0 0 1 |

FIG. 16

| A1 | A2 | A3 | A4 | A5 | A6 | | O1 | O2 | O3 | O4 | O5 | O6 | O7 | O8 | O9 | OT |
|----|----|----|----|----|----|---|----|----|----|----|----|----|----|----|----|----|
| 0 | 0 | x | x | x | x | | 0 | 0 | 0 | x | x | x | x | x | x | 3 |
| 1 | 1 | x | x | x | x | | 1 | 1 | 1 | x | x | x | x | x | x | 3 |
| 0 | 1 | 0 | 0 | x | x | | 0 | 0 | 0 | 0 | 0 | 1 | x | x | x | 6 |
| 0 | 1 | 0 | 1 | x | x | | 0 | 0 | 0 | 0 | 1 | 1 | x | x | x | 6 |
| 0 | 1 | 1 | 0 | x | x | | 1 | 0 | 0 | 0 | 0 | 0 | x | x | x | 6 |
| 0 | 1 | 1 | 1 | x | x | | 1 | 1 | 0 | 0 | 0 | 0 | x | x | x | 6 |
| 1 | 0 | 0 | 0 | x | x | | 1 | 0 | 0 | 0 | 0 | 1 | x | x | x | 6 |
| 1 | 0 | 0 | 1 | x | x | | 1 | 1 | 0 | 0 | 0 | 1 | x | x | x | 6 |
| 1 | 0 | 1 | 0 | x | x | | 1 | 0 | 0 | 0 | 1 | 1 | x | x | x | 6 |
| 1 | 0 | 1 | 1 | 0 | 0 | | 0 | 0 | 0 | 0 | 1 | 0 | 0 | 0 | 1 | 9 |
| 1 | 0 | 1 | 1 | 0 | 1 | | 0 | 0 | 0 | 0 | 1 | 0 | 0 | 0 | 0 | 9 |
| 1 | 0 | 1 | 1 | 1 | 0 | | 1 | 0 | 0 | 0 | 1 | 0 | 0 | 0 | 1 | 9 |
| 1 | 0 | 1 | 1 | 1 | 1 | | 1 | 0 | 0 | 0 | 1 | 0 | 0 | 0 | 0 | 9 |

| C1 | C2 | C3 | IA1 | IA2 |
|----|----|----|-----|-----|
| 0  | 0  | 0  | 0   | 0   |
| 1  | 1  | 1  | 1   | 1   |

| C1 | C2 | C3 | C4 | C5 | C6 | IB1 | IB2 | IB3 | IB4 |
|----|----|----|----|----|----|-----|-----|-----|-----|
| 0  | 0  | 0  | 0  | 0  | 1  | 0   | 1   | 0   | 0   |
| 0  | 0  | 0  | 0  | 1  | 1  | 0   | 1   | 0   | 1   |
| 1  | 0  | 0  | 0  | 0  | 0  | 0   | 1   | 1   | 0   |
| 1  | 1  | 0  | 0  | 0  | 0  | 0   | 1   | 1   | 1   |
| 1  | 0  | 0  | 0  | 0  | 1  | 1   | 0   | 0   | 0   |
| 1  | 1  | 0  | 0  | 0  | 1  | 1   | 0   | 0   | 1   |
| 1  | 0  | 0  | 0  | 1  | 1  | 1   | 0   | 1   | 0   |

| C1 | C2 | C3 | C4 | C5 | C6 | C7 | C8 | C9 | IC1 | IC2 | IC3 | IC4 | IC5 | IC6 |
|----|----|----|----|----|----|----|----|----|-----|-----|-----|-----|-----|-----|
| 0  | 0  | 0  | 0  | 1  | 0  | 0  | 0  | 1  | 1   | 0   | 1   | 1   | 0   | 0   |
| 0  | 0  | 0  | 0  | 1  | 0  | 0  | 0  | 0  | 1   | 0   | 1   | 1   | 0   | 1   |
| 1  | 0  | 0  | 0  | 1  | 0  | 0  | 0  | 1  | 1   | 0   | 1   | 1   | 1   | 0   |
| 1  | 0  | 0  | 0  | 1  | 0  | 0  | 0  | 0  | 1   | 0   | 1   | 1   | 1   | 1   |

METHOD OF AND DEVICE FOR RECORDING INFORMATION, RECORD CARRIER, DEVICE FOR READING THE RECORDED INFORMATION, AND ENCODING AND DECODING CIRCUIT FOR USE IN THE RECORDING AND READ DEVICE

This is a continuation of application Ser. No. 07/494,873, filed Feb. 8, 1990 now abandoned, which is a continuation of application Ser. No. 190,723, filed May 5, 1988 now abandoned.

BACKGROUND OF THE INVENTION

The invention relates to a method of recording information on a record carrier, in which an information signal is converted into a code signal comprising code words made up of bits, the number of successive bits of a first logic value being at least equal to P and groups of at least P bits of a first logic value within each code word being separated by at least Q successive bits of a second logic value, P being an integer greater than or equal to 1 and Q being an integer greater than P, in which method a pattern of recording marks corresponding to the code signal is formed on the record carrier, the recording marks representing the bits of the first logic value.

The invention also relates to a device for recording information on a record carrier, which device comprises an encoding circuit for converting an information signal into a binary code signal made up of code words, the number of successive bits of a first logic value in each code word being at least P and groups of at least P bits of the first logic value being separated by at least Q successive bits of a second logic value, P being an integer greater than or equal to 1 and Q being an integer greater than P, the device further comprising drive means for moving the record carrier relative to the write means, the write means being adapted to form an elementary mark on the record carrier in response to a code-signal bit of the first logic value.

The invention further relates to a record carrier provided with an information track in which information is recorded as an information pattern of recording marks, the information pattern comprising code symbol which represent code words. The code symbols occupy substantially equidistant symbol positions, a number of said positions being occupied by a recording mark, and the number of successive symbol positions occupied being at least equal to P and the number of non-occupied successive symbol positions within the code symbols which are situated between the group of occupied symbol positions being at least equal to Q, P being an integer greater than or equal to 1 and Q being greater than P.

Moreover, the invention relates to a device for reading the record carrier.

In addition, the invention relates to an encoding and decoding circuit for use in the recording and read device.

Said method, record carrier, recording and read device are known, inter alia from British Patent Specification-GB 2,148,670.

In the method and the recording device described therein 8-bit information words of the information signal are converted into 15-bit code words, the number of successive "1" bits being at least 1 and the number of successive "0" bits being at least 2.

When the record carrier is read the pattern of recording marks is scanned by a laser beam, the reflected laser beam being modulated by the pattern being scanned. An optical detector detects the reflected laser beam to generate a detection signal of a signal strength corresponding to the degree of modulation of the laser beam. Subsequently, the code signal is recovered from the detection signal. In order to ensure a reliable detection the code words should meet the additional requirement that the number of "1" bits is 4 for every code word. In that case every code word can be recovered reliably from the detection-signal portion corresponding to said code word by selecting the four positions of most extreme signal strength in the detection signal. Such a detection method is known as differential detection.

SUMMARY OF THE INVENTION

It is an object of the invention to provide a method and device which enable an information signal to be recorded in such a way that a higher information density is obtained on the record carrier while maintaining a reliable read-out of the record carrier.

In respect of the method this object is ..achieved by having the number of bits of the first logic value to be code-word dependent.

In respect of the device this object is achieved by having the encoding circuit constructed to generate code words comprising a variable number of bits of the first logic value.

The invention is based inter alia on the recognition of the fact that, if the requirement of a constant number of "1" bits per code word is abandoned, the number of code-word bits needed can be reduced substantially without the reliability being affected, provided that level detection is applied instead of differential detection. In such a level detection technique the detection signal is compared with a decision level at substantially equidistant instants. The logic value of the recovered code-signal bit is then dictated by the result of the comparison.

An embodiment of the method is characterized in that each code word begins with P bits of the first logic value or begins with Q bits of the second logic value, and in that each code word ends with P bits of the first logic value or ends with Q bits of the second logic value. This embodiment has the advantage that the code words can be arranged in an arbitrary sequence after one another, without the number of successive bits of the second logic value becoming smaller than Q and without the number of successive bits of the first logic value becoming smaller than P in the transitional areas between successive code words.

It is found that, for example if P=1, only Q-1 more bits are needed for the code words than if the requirements just mentioned are not imposed on the beginning and end of the code words.

When the information signal is recorded it is customary to convert information words with a constant number of bits (m) into code words which also have a constant number of bits (n), which results in a specific ratio between the number of information bits and the number of code bits.

This ratio and hence the information density can be increased considerably, while the code bit length and P and Q remain the same, in an embodiment of the method in which every m-bit information word of a first group is converted into a unique n-bit code word, m and n being selected in such a way that the number of available n-bit code words is smaller than the number of possible m-bit information words, and in that m-bit information words not belonging to the first group are combined with at least one adjacent m-bit information word to form r×m-bit information words, r being an integer, which (r×m)-bit information words are converted into unique (r×n)-bit code-words.

The encoded information thus recorded can be read advantageously by means of a device for reading a record carrier on which an encoded information signal is recorded as a pattern of recording marks, which device comprises read means for scanning the pattern and for generating a detection signal which is representative of the pattern being scanned, means for converting the detection signal into a code signal comprising groups of n-bit code words, and a decoding circuit for converting the code signal into an information signal. The device further comprises means for generating (r×n)-bit code words, r being a variable integer greater than or equal to 1, the decoding circuit comprises detection means for determining, in order to detect the boundaries between the code words, whether in two successive n-bit groups the last n-bit group begins either with P bits of the first logic value or with Q bits of the second logic value and, in addition, whether the first group of the successive groups either ends with P bits of the first logic value or begins with Q bits of the second logic value, and means for converting the (r×n)-bit code words into (r×m)-bit information words. Another embodiment of the recording method is carried out with reference marks of the same type as the recording marks freely situated; at retraceable positions on the record carrier and outside the area used for information recording.

This embodiment enables the decision level to be derived from the detection signal in a reliable manner. When the information signal thus recorded is read the decision level can be derived simply from that part of the detection signal which corresponds to the freely situated reference marks. If this method of deriving is used, parameters such as the beam intensity, the reflection coefficient of the record carrier etc. will hardly affect the reliability of the read process.

Yet another embodiment of the recording method is characterized in that the record carrier is provided with a preformed pattern of information tracks, the information track being provided with control signals which can be distinguished from the pattern of recording marks to be formed. The reference marks are arranged at predetermined positions relative to the control symbols.

This embodiment has the advantage that the reference marks are easy to locate.

BRIEF DESCRIPTION OF THE DRAWING

Further embodiments of the method and devices and further advantages thereof will now be described in more detail, by way of example, with reference to FIGS. 1 to 25, of which FIGS. 1a and 1b show an optically inscribable record carrier, FIGS. 2 and 3 show for different recording systems a code signal Vc, the pattern of recording marks representing said code signal on the information carrier, the detection signal Vd obtained when the record carrier is read and the code signal Vc' recovered from the recording signal from the FIGS. 4a and 4b show an embodiment of the read and write devices, FIG. 15 illustrates the relationship between an arbitrary information signal and the associated code signal for an embodiment of the inventive method.

DETAILED DESCRIPTION OF THE INVENTION

Figure 5:
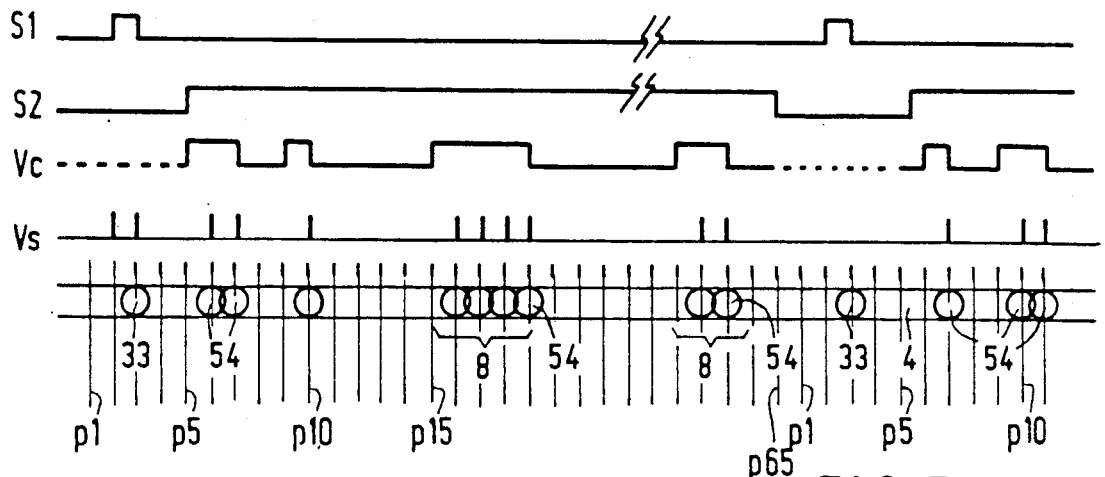
FIG. 5 shows a number of signal waveforms appearing in the device shown in FIG. 4, FIGS. 6a and 6b show embodiments of an optically inscribable record carrier.

FIG. 1a shows a disc-shaped record carrier 1 provided with a preformed pattern of tracks 4.

Such a track pattern may comprise, for example, a preformed spiral groove in a substrate 5. In FIG. 1b, which shows a part of the sectional view of the record carrier 1 taken on the line b—b, these grooves are shown at a greatly enlarged scale. The substrate 5 is covered with a radiation-sensitive layer 6 of a customary type which, if exposed to radiation of a sufficiently high energy content, is subjected to an optically detectable change. Such a layer 6 may consist of, for example, a tellurium alloy, which by exposure to a radiation beam can be heated locally in such a way that the layer is removed at the location of heating.

The layer 6 may alternatively consist of a "phase-change" material, which upon heating by a radiation beam is subjected to a change in structure, for example a change from an amorphous to a crystalline structure or vice versa Alternatively, the layer 6 may consist of a magneto-optical material whose direction of magnetization can be changed by influencing the layer by applying a magnetic field and at the same time locally heating the magneto-optical material by means of a radiation beam. The layer 6 is covered with a protective coating 7.

The track pattern shown in FIG. 1 comprises a continuous groove. However, such a track pattern may also be constituted exclusively by, for example, servo-control symbols situated at equidistant angular positions, which symbols define the position of the track to be used for recording.

An information signal can be recorded in the track 4 by scanning the track 4 with a radiation beam and modulating the beam in such a way that a pattern of recording marks representative of the information signal is formed in the track. For this purpose it is common practice to convert the information signal into a binary code signal and subsequently to modulate the radiation beam in conformity with the code signal, yielding a pattern of recording marks such that portions of the code signal of a first logic value, for example "1", in the pattern correspond to portions of the track occupied by recording marks and portions of an other logic value, for example "0", correspond to the unoccupied track portions.

FIG. 2 shows patterns of recording marks 8 and the corresponding code signal Vc obtained as described above.

Said code signal Vc comprises bit cells 9 of constant length. The centres of the bit cells 9 correspond to equidistant symbol positions, indicated by the letter p in FIG. 2. The code signal Vc can be read from the track 4 by scanning the track 4 with a radiation beam and subsequently detecting the modulation produced in the reflected beam by the pattern of recording marks 8 by means of an optical detector of a customary type. The optical detector generates a detection signal Vd of a signal strength corresponding to the modulation of the radiation beam produced during scanning. The detection signal Vd thus obtained is also shown in FIG. 2. A code signal Vc' identical to the original code signal Vc is recovered from the detection signal Vd by comparing the detection signal Vd with a decision level Vref at the instants at which the centre of the radiation beam corresponds to the symbol positions p. The logic value of the recovered code signal Vc depends on the result of the comparison. In order to enable the reference level to be derived simply from the detection signal Vc it is customary to utilize a d.c. limited code. The d.c. component in the detection signal may then be employed as the decision level.

The requirements to be imposed on the code in order to obtain this d.c. limitation make this code less suitable for use in systems in which digital information is to be recorded at random locations on the record carrier, as is generally desirable in computer applications.

Referring now to FIG. 3, a method of recording and reading in accordance with the invention will be described, which enables the decision level to be recovered from the detection signal Vd in a simple and reliable manner and which does not impose any restrictions on the code.

In the track 4 shown in FIG. 3 portions 30, representative of portions 32 of the code signal Vc, alternate with portions 31 in which a reference mark 33 is formed. The reference marks 33 are formed in the layer 6 by means of a radiation beam in the same way as the recording marks 8, so that they have the same modified optical properties as the recording marks 8, which in the Figure comprise one or more elementary marks 54. These elementary marks are the smallest possible marks that can be formed by the recording device used.

When the track 4 is read the reference level is derived from that portion of the detection signal Vd which corresponds to the reference mark 33, for example by selecting a reference level which is equal to a predetermined percentage of the difference 34a between the minimum and the maximum value of the detection-signal portion 34.

Another suitable value for the reference level is the signal strength of the detection signal at the instant at which the spacing between the centre of the radiation beam and the centre of the reference mark 33 is equal to half the spacing between the symbol positions p. In FIG. 3 these values bear the reference numeral 35.

In order to enable the reference level Vref to be derived, it is necessary to provide the reference marks 33 at retraceable positions. If a disc-shaped record carrier is used this can be achieved, for example, by arranging the reference marks at predetermined angular positions. In the case of a record carrier provided with preformed optically detectable control symbols which can be distinguished from the patterns of recording marks as formed during information recording, the reference marks 33 are preferably situated at predetermined positions relative to these control symbols.

In the method described in the foregoing the reference level is derived from the detection signal. This has the advantage that the intensity of the radiation beam and the properties of the material of the layer 6, for example the reflection coefficient, do not influence the reliability of the recovery of the code signal Vc'.

FIG. 4 shows an embodiment of a recording and read device in accordance with the invention. In the present embodiment the record carrier 1 is fixed onto a turntable 40. The turntable 40 is driven by drive motor 41 which is mechanically coupled to a pulse generator 42 for generating a pulse-shaped clock signal C1 whose frequency is proportional to the angular velocity of the record carrier 1.

The period of the clock pulses of the clock signal corresponds to the spacing between the symbol positions p. The pulse generator 42 further comprises customary means for generating one reset pulse for every revolution. The clock signal c1 is applied to a cyclic counter 43 for counting the pulses of the clock signal cl. The count or range of the cyclic counter 43 is selected so as to obtain an integral number of counter cycles in one complete revolution of the disc. In the present embodiment the counter range is "65". The reset pulse cr is applied to a reset input of the counter 43 to set the counter 43 to zero. The count of the counter 43 is transferred to a gate circuit 45 via a bus 44, which gate circuit generates a signal S2 of a logic value "1" for the counts "6" to "65" and a signal S1 of a logic value "1" during the time that the count of the counter 43 is "3". The gate circuit 45 may comprise conventional comparator circuits, which compare the count with a desired count and which supply the result of the comparison in the form of a logic signal. However, it is also possible to use other circuits, for example a read-only memory (ROM) or a programmable logic array (PLA).

An optical read/write head 47 of a customary type is arranged opposite the rotating record carrier 1 to scan the track 4 by means of a radiation beam 46. The read/write head 47 comprises beam-modulating means for modulating the beam in conformity with a write signal Vs supplied by a write circuit 48 to form the pattern of recording marks in the track 4.

The write circuit 48 comprises an encoding circuit 61 for converting the binary information signal Vi into the code signal Vc. The encoding circuit, which is shown in detail in FIG. 4a, comprises a serial-parallel converter 62 to form m-bit information words, for example 8-bit information words. By means of a memory 63, for example a ROM, the m-bit information words are converted into n-bit code words, for example 12-bit code words. The n-bit code words are converted into the serial code signal Vc by means of a parallel-serial converter 64.

In order to control the conversion process the encoding circuit 61 comprises a control circuit 65 which is adapted to generate clock signals c12 and c13, which are derived from the clock signal c1 in a customary manner. The control circuit 65 is dimensioned in such a way that the frequency of the clock signal c12, which is applied to the clock input of the serial-parallel converter 62 via a two-input AND-gate 66, is equal to m/n times the frequency of the clock signal c1.

The frequency of the clock signal c13, which is applied to the parallel load input of the parallel-serial converter 64 via the two-input AND-gate 67, is equal to t/n times the frequency of the clock signal c1. The clock signal c1 is applied to the clock input of the parallel-serial converter 64 via a two-input AND gate 68. Moreover, the signal S2 is applied to the inputs of the AND gates 66, 67 and 68, so that during the counts "6" to "65" the clock signals c1, c12 and c13 are transferred to the converters 62 and 64 and during the counts "1" to "5" the clock signals c1, c12 and c13 are inhibited by the gates 66, 67 and 68. Thus, it is achieved that during scanning of the symbol positions p6 to p65 the information signal Vi is converted into the code signal Vc and during scanning of the symbol positions p1 to p5 conversion is discontinued.

The code signal Vc is applied to one of the inputs of a two-input AND gate 51 and the signal S2 is applied to the other input of the AND-gate 51, so that the code signal Vc is only transferred to the output of the AND gate 51 while the symbol positions p6 to p65 are scanned. The output of the AND gate 51 is applied to one of the inputs of the two-input AND gate 53 via an OR gate 52. The pulse-shaped clock signal c1 is applied to the other input of the AND gate 53, so that for each code bit of the logic "1" value one pulse of the clock signal is transferred to the output of the AND gate 53 (see FIG. 5). The output signal of the AND gate 53 functions as the write signal Vs for the write head 47. In response to every pulse of the write signal Vs the write head 47 produces a radiation pulse to expose the layer 6 over an area corresponding to the diameter of the radiation beam and thereby produce an optically detectable change in this area. These areas constitute the elementary marks 54. As is apparent from FIG. 5, all the recording marks thus formed comprise one or more of these elementary marks 54.

When the count "1" is reached the flow of code-word bits at the output of the encoding circuit 61 is temporarily interrupted in response to a 1-0 transition in the signal S2 until the count "6" is reached again and the signal S2 becomes "1" again. When the count "3" is reached the signal S1 becomes "1". As this signal is also applied to the AND gate 53 via the OR gate 52, a clock pulse of the clock signal c1 is transferred to the read write head 47 for the count "3", so that for every count "3" an elementary mark 54 is recorded in the track 4, which mark functions as a reference mark 33.

If the track 4 is to be read, the read/write head 47 can be set to the read mode, in which mode the intensity of the radiation beam 46 is maintained at a constant value which is inadequate to produce a change in the layer 6. The read/write head 47 comprises an optical detector for detecting the modulation produced in the reflected beam by the pattern of recording marks 8 in the track 4 and for generating a detection signal Vd of a signal strength corresponding to this modulation. The detection signal Vd is applied to a read circuit 55. The read circuit 55 comprises a comparator 56 having a non-inverting input to which the detection signal Vd is applied and having an inverting input to which a reference signal whose voltage level corresponds to the decision level Vref is applied.

The output of the comparator 56 is applied to a serial data input of a serial-parallel converter 62a of a decoding circuit 57 (see FIG. 4b). The serial-parallel converter 62a is controlled by the clock signal C1, which is applied to the clock input of the converter 62a via a two-input AND gate 66a. The signal S2 is also applied to the AND gate 66a, so that the output signal of the comparator 56 is read into the converter 62a only during the time that this output signal is representative of the recovered code signal Vc'. The signal on the output of the comparator 56 is thus converted into n-bit code words, which are converted into m-bit information words by means of a memory 63a, for example a ROM. In response to the clock signal c12', which is applied via a two-input AND gate 68a, the m-bit information words are read into a parallel-serial converter 64a.

The m-bit information words thus read in are converted into the serial binary information signal Vi' under control of a clock signal c13', which is applied to the clock input of the converter 64a via a two-input AND gate 67a. The signal S2 is also applied to the gates 67a and 68a, so that conversion is discontinued during the time interval in which S2 indicates that the symbol positions p1 to p5 are being scanned. The clock signals c12' and c13' are derived from the clock signal c1 in a customary manner by means of a control circuit 65a, which is dimensioned in such a way that the frequencies of the clock signals c12' and c13' are equal to m/n times and 1/n times the frequency of the clock signal c1 respectively.

For the purpose of deriving the reference signal the read circuit 55 comprises a sample-and-hold circuit 58 for sampling the detection signal at instants at which the centre of the beam 46 has reached a position which is situated at a distance beyond the centre of the reference mark 33 which corresponds to substantially half the spacing between the symbol positions. The control signal for the circuit 58 can be derived from the signal S1 by delaying the signal S1 by a time corresponding to half the spacing between the symbol positions by means of a delay circuit 60. The level of the output signal of the circuit 58 can be used as the decision level Vref. Suitably, the output signal of the circuit 58 is applied to the comparator 56 via a low-pass filter 59.

The output signal of the low-pass filter 59 is a measure of the weighted mean of the samples of the detection signal, the influence of the reference marks on the output signal diminishing as scanning of the reference mark took place earlier. The advantage of such an averaging is that the influence of an incorrectly recorded or read reference mark on the reference level is minimal. It will be appreciated by those skilled in the art that averaging can be achieved by numerous other methods than by means of a low-pass filter, for example by means of a microcomputer loaded with a suitable averaging program.

It is to be noted that there are various other ways of deriving the decision level from the detection-signal portions obtained during scanning of the reference marks 33. For example, the signal value of the flat portion of the detection signal Vd just before or just after scanning of the reference area can be sampled by means of a first sample-and-hold circuit. Subsequently, the maximum signal value during scanning of the centre of the reference mark 34 can be determined by means of a second sample-and-hold circuit. The difference between the output signals of the sample-and-hold circuits indicates the height of the signal peak produced in the detection signal Vd by the reference mark 34. The decision level can be derived from this peak height by multiplying the signal value of the peak height by a specific factor. Since the spacing between the symbol positions depends on the radius (the record carrier rotates with a constant angular velocity) and hence the magnitude of the eye opening of the eye pattern dictated by the detection velocity, it is desirable to make said multiplication factor dependent upon the radius in order to obtain an optimum decision level (i.e.) the centre of the smallest eye opening), in such a way that the decision level is adjusted to a higher value as the spacing between the symbol positions decreases, i.e. as the track to be read is situated closer to the disc centre.

This can be achieved, for example, by arranging a multiplier in the signal path between the output of the filter 59 and the comparator 56, to multiply the output signal of the low-pass filter by a radius-dependent value which can be derived from the radial position of the read/write head 47 in a customary manner by means of a position detector.

It is to be noted that if the decision level is derived from the detection signal value at the instant at which the scanning beam is situated at half the symbol-position spacing, the desired decision level in the case of very high information densities should be higher than the detected value as a result of inter-symbol interference. In the case of a disc-shaped record carrier it is then also desirable to apply a radius-dependent correction to the level thus detected.

It is to be noted also that in principle the radius-dependent adaptation is not necessary if the decision level is adjusted to a value suitable for the minimum symbol-position spacing.

In the device shown in FIG. 4 the cyclic counter 43 is controlled by the clock pulses c1 from the pulse generator 42. However, alternatively the counter 43 can be controlled by clock pulses supplied by a fixed-frequency oscillator, the motor being controlled by means of phase-locked-loop techniques in such a way that the pulses generated by the pulse generator 43 are in synchronism with the clock pulses generated by the oscillator.

Figure 6A:
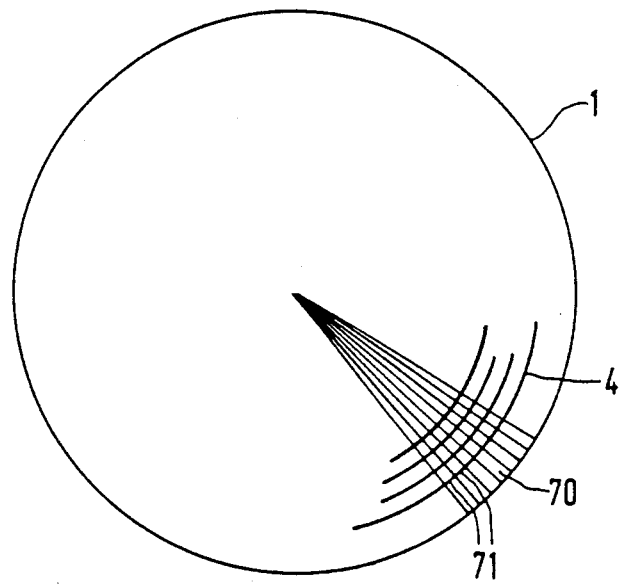

FIG. 6a shows an embodiment of the record carrier 1, which is divided into sectors 70, which are shown only partly in FIG. 6a. These sectors divide the tracks into the segments 71.

Figure 6B:
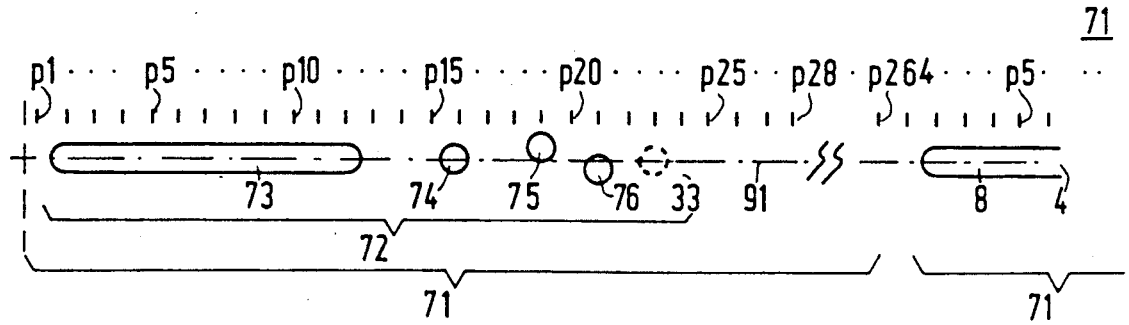

FIG. 6b shows one of the segments 71 at a strongly enlarged scale. Each segment comprises a fixed number of symbol positions. For the present record carrier this number is selected to be, for example, 264.

The portion of the track 4 comprising the symbol positions p1 to p24 contains a preformed optically detectable control symbol 72, comprising for example prerecorded pits. The control symbol and the code used for recording the information signal are adapted to one another in such a way that the pattern of prerecorded control marks 73, 74, 75 and 76 differs from the pattern of recording marks 8 formed when the information signal is recorded.

For example, if a code is selected for which the maximum length of the recording marks 8 to be formed is smaller than the prerecorded control mark 73, the control symbol 72 can always be distinguished from the pattern of recording marks 8 formed when the information signal is recorded.

For the purpose of controlling the write and read process, control marks 74, 75 and 76 are formed. The manner in which the necessary control signals are derived from the control marks 74, 75 and 76 will be described in detail hereinafter.

Figures 7, 7A:
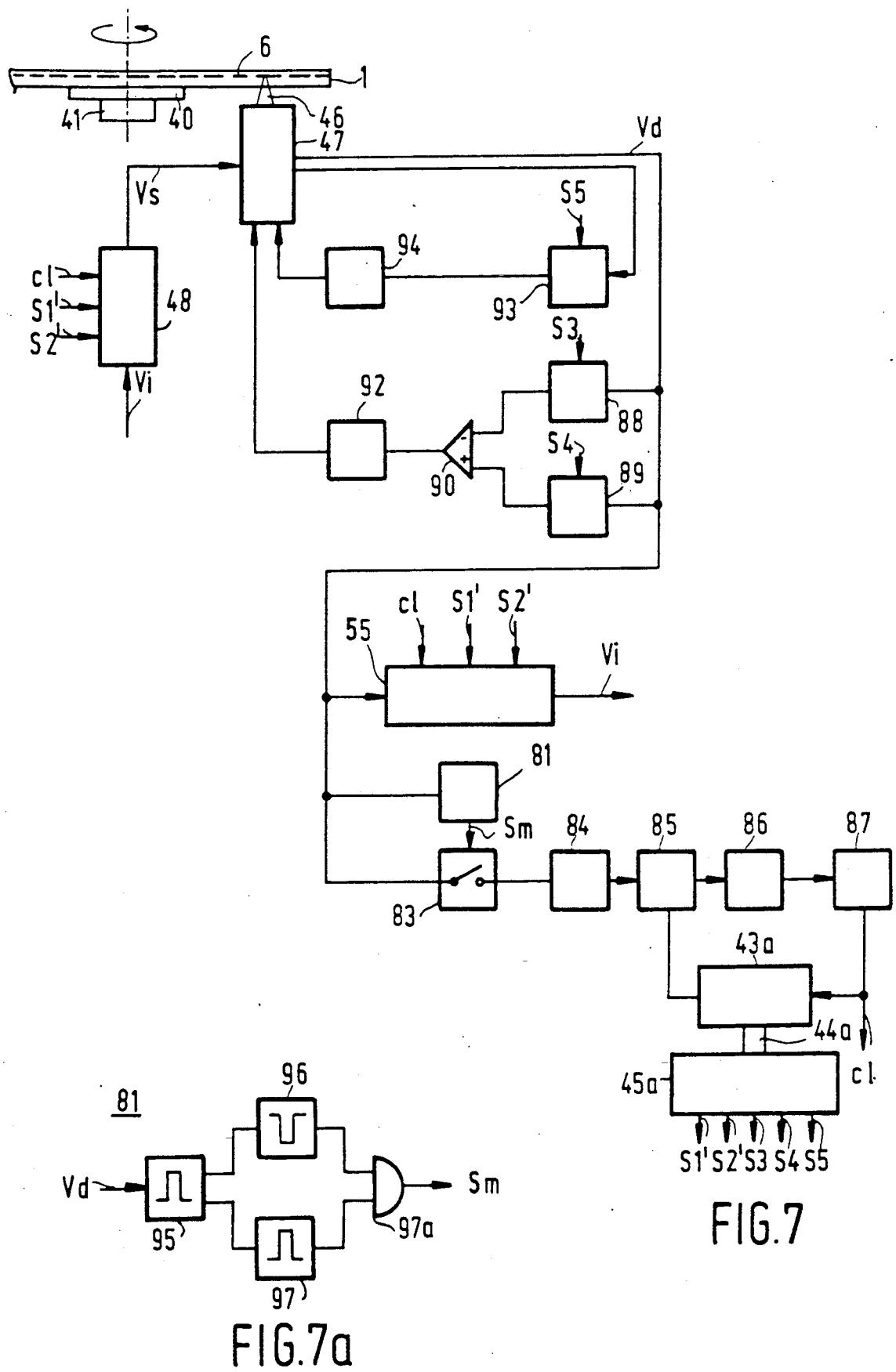
FIGS. 7 and 7a shows another embodiment of the write and read device.

FIG. 7 shows an embodiment of a write and read device in accordance with the invention for recording and reading an information signal on/from the record carrier shown in FIG. 6, elements corresponding to the elements shown in FIG. 6 bearing the same reference numerals.

The detection signal Vd supplied by the write/read head 47 is applied to a detection circuit 81 for detecting the control marks 73, whose length corresponds to eleven symbol positions. The detector circuit 81, shown by way of example, comprises a level-sensitive retriggerable monostable multivibrator 95 which is retriggered each time that a low level appears on its trigger input, so that in the case of a sustained low-level signal on the trigger input the output signal of the multivibrator 95 remains "1". The monostable multivibrator 95 operates in such a way that after the level on the trigger input has changed from low to high the output signal remains "1" for a time interval corresponding to 11.5 symbol positions.

The output signal of the detector circuit 81 is applied to a monostable multivibrator 96 and a monostable multivibrator 97, which are responsive to a 1-0 transition in the output signal of the multivibrator 95 to generate a positive pulse and a negative pulse respectively. The positive and negative pulses are applied to an AND-gate 97a. The pulse durations of the positive and the negative pulses are selected in such a way that on the output of the AND gate 97 a control signal is produced during the time interval which includes at least the scanning of the control marks 74 at the symbol positions 16 and which at most include the scanning of the symbol positions p13 to p18. The control signal Sm on the output of the detector circuit 81 is applied to a control input of an electronic switch 83, which is responsive to the control signal to apply the detection signal Vd to a pulse shaper 84, for example a level-sensitive monostable multivibrator.

In this way a pulse is generated on the output of the pulse shaper 84 in response to the scanning of the control mark 74. This pulse is applied to a phase detector 85 of a phase-locked loop circuit, which further comprises a loop filter 86, a voltage-controlled oscillator 87 and a frequency divider in the form of a cyclic counter 43a, which every counting cycle supplies one pulse to the phase detector 85. The counter range of the counter 43a corresponds to the number of symbol positions within the track segments 71, so that the count of the counter 43a always indicates the instantaneously scanned symbol position within the track segment 71.

The output signals of the counter 43a are applied to a gate circuit 45a via a bus 44a, which gate circuit derives five signals S1', S2', S3' and S4' from the count in the customary manner, in such a way that the signal S1' is "1" for the count which indicates that the symbol position p23 is scanned, the signal S2' is "1" for those counts which indicate that the symbol positions p25 to p264 are scanned, the signal S3 is "1" for the count which indicates that the symbol position p19 is scanned, the signal S4 is "1" for the count which indicates that the symbol position p21 is scanned, and S5 is "1" for the count which indicates that the symbol position p14 is scanned.

In the same way as the write circuit is controlled by the signals S1, S2 and c1 in the embodiment described with reference to FIG. 4, the read circuit 48 in the embodiment shown in FIG. 7 is controlled by the signals S1', S2', c1, the signal c1 being the output signal of the oscillator 87.

Control of the read circuit 55 by the signals c1, S1' and S2' is also similar to control of the read circuit 55 by the signals c1, S1 and S2 in the embodiment shown in FIG. 4.

The signals S3, S4 and S5 are used for determining the sampling instants for the sampled servo controls for the purpose of tracking and focussing.

The sampled servo control for tracking comprises a first (88) and a second (89) sample-and-hold circuit to which the detection signal Vd is applied. The outputs of the circuits 88 and 89 are respectively applied to the inverting input and the non-inverting input of a differential amplifier 90.

The circuit 88 is controlled by the signal S3, which indicates the scanning instant of the control mark 75 at symbol position p19.

The circuit 89 is controlled by the signal S4, which indicates the scanning instant of the control mark 76 at symbol position p21.

The control mark 75 is offset from the centre 91 of the track 4. The control mark 76 is offset from the centre 91 in the opposite direction.

The output signal on the output of the differential amplifier 90, which signal indicates the difference in the detection signal Vd at the scanning instants of the control marks 75 and 76, is consequently a measure of the tracking error.

The output signal is applied to a control circuit 92, which in a customary manner derives a control signal from the tracking error, which control signal is applied to the write/read head 47 to keep the beam 46 centred on the track 4 to be scanned.

The sampled servo control for keeping the radiation beam 46 in a focus on the layer 6 comprises a focus-error detection system of a customary type, for example an astigmatic focus-error detection system accommodated in the write head 47, to generate the focus-error signal. The focus-error signal is applied to a sample-and-hold circuit 93, which is controlled by the signal S5, which indicates the instant at which a flat portion of the layer 6 at the location of the symbol position p14 is scanned. The output signal of the sample-and-hold circuit 93 is applied to a control circuit 94, which derives a control signal from the sampled focus-error signal to keep the beam 46 focussed on the layer 6.

The embodiment of the write and read device shown in FIG. 7, which combines the use of reference marks for determining the decision level with the use of sampled servo systems and the use of circuits for deriving the clock signal from the control symbols 72, has the advantage that the pattern of recording marks 8 used for recording the information has no influence whatsoever on the generation of the clock signal, the tracking control, the focus control, and the derivation of the decision level. Thus, the number of requirements to be imposed on the code is minimal, which means that code classes may be used which enable a very high information density to be achieved on the record carrier.

The invention has been described for a record carrier which is read in reflection, but it will be obvious that the invention may also be applied to record carriers read in transmission.

A suitable class of codes enabling a high in& formation density to be obtained on the record carrier includes the codes in which the information signal is converted into code words comprising code bits, the number of code bits of a first logic value, for example "1", being Variable, the number of successive bits of this logic value within the code word being at least equal to P, and the number of groups of at least P successive bits of the first logic value within each code word being separated from one another by at least Q successive bits of an other logic value, Q being greater than P. Such a code word can be recorded by means of code symbols with a number of equidistant symbol positions equal to the number of bits of the code word, a bit of the first logic value being represented by an elementary mark 54 situated at a symbol position corresponding to the bit position within the relevant code word. At the symbol positions corresponding to the bit positions of bits of the second logic value "0" no elementary mark is formed.

Figure 8:
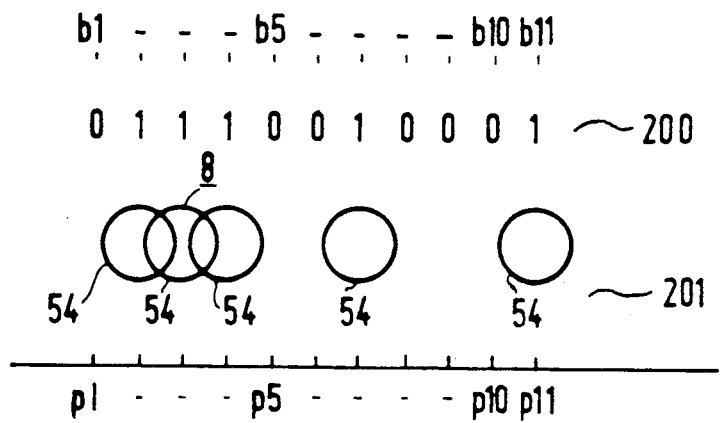
FIG. 8 shows an example of a code word and the associated pattern of recording marks used in the inventive method.

FIG. 8 shows by way of example, for P is 1 and Q is 2 a possible code word 200 and a code symbol 201 recorded on the record carrier and corresponding to the code word 200. The "1" bits at bit positions b2, b3, b4, b7 and b11 are represented by elementary marks 54. As already described hereinbefore, the elementary marks can be formed with the aid of a radiation pulse. It is to be noted that at high information densities the diameter of the elementary mark 54 is greater than the spacing between the symbol positions.

Figure 9:
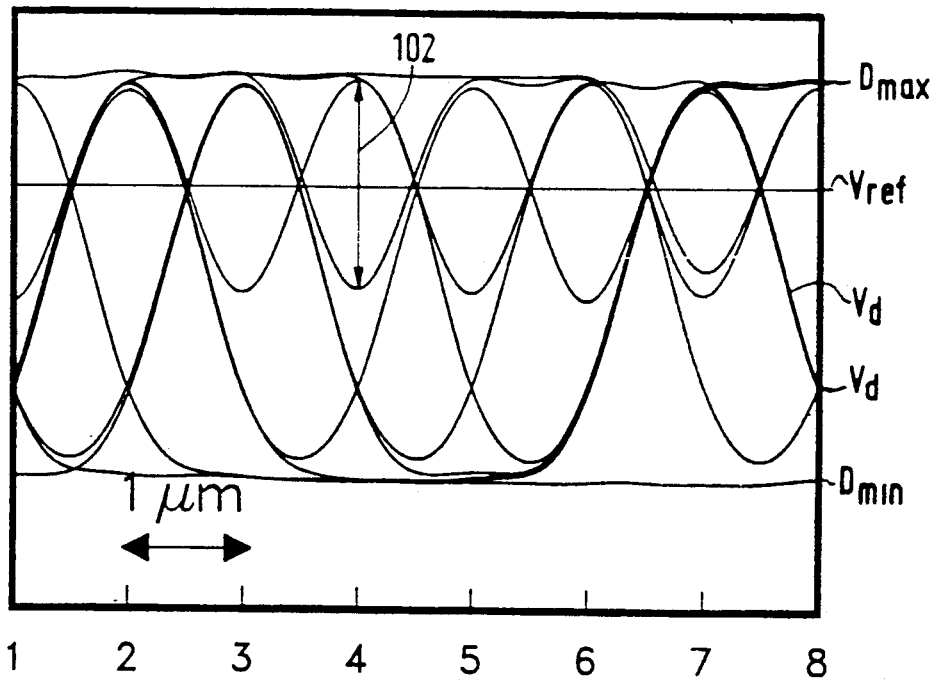
FIGS. 9 and 10 shows eye patterns derived from the detection signal Vd for different spacings between the symbol positions.

If the information densities for different codes are to be compared it is customary to compare the magnitudes of the smallest eye openings in the eye patterns obtained by means of the detection signal Vd. FIG. 9 shows such an eye opening for a detection signal Vd obtained if the information signal is recorded without being encoded. Such an eye pattern is obtained by recording different portions of the detection signal over one another in such a way that the phase relationship between the detection signal and the channel clock signal is maintained. The most favourable instants for determining the logic value of a bit of the code word to be recovered are the instants at which the eye opening is maximal. These instants are indicated by the digits "1" to "8" in FIG. 9 and correspond to the instants at which the centre of the scanning beam coincides with a symbol position. The time interval between these instants consequently corresponds to the spacing between the symbol positions. In FIG. 8 this spacing is approximately 1 μm.

To determine the logic value of each code bit the detection signal Vd is compared with the reference level Vref. This means that reliability of this process will decrease as the eye opening becomes smaller. The magnitude of the smallest eye opening in the eye pattern is a suitable criterion of the reliability (in FIG. 9 this is indicated by the arrow 102).

Figure 10:
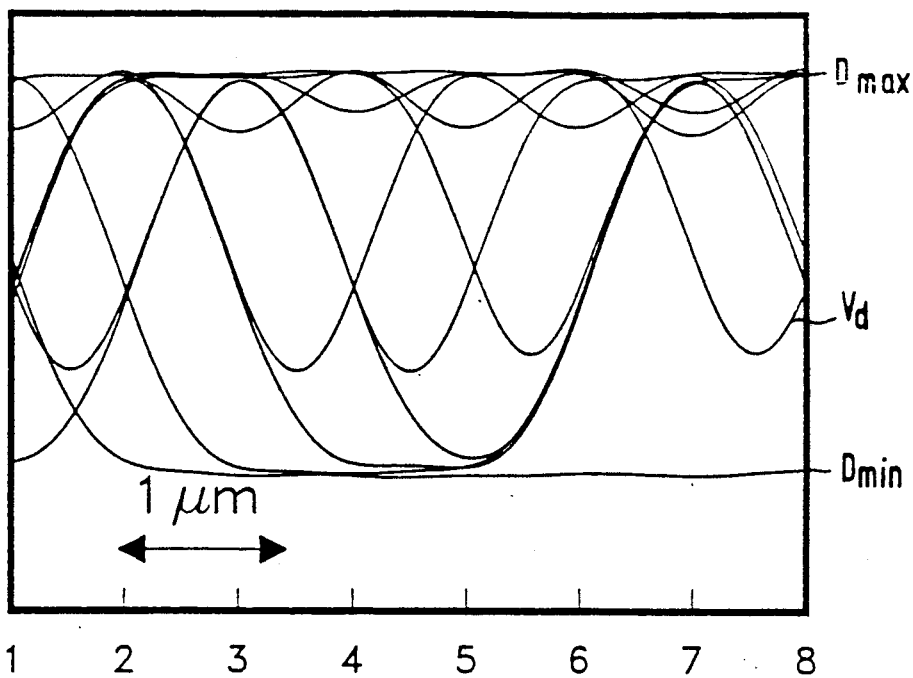

If the spacing between the symbol positions decreases, the information density increases, but the magnitude of the eye openings and hence the reliability decrease. By way of illustration FIG. 10 shows an eye pattern in the case that the spacing between the symbol positions has decreased by approximately 50% in comparison with the situation in FIG. 9.

Figure 11:
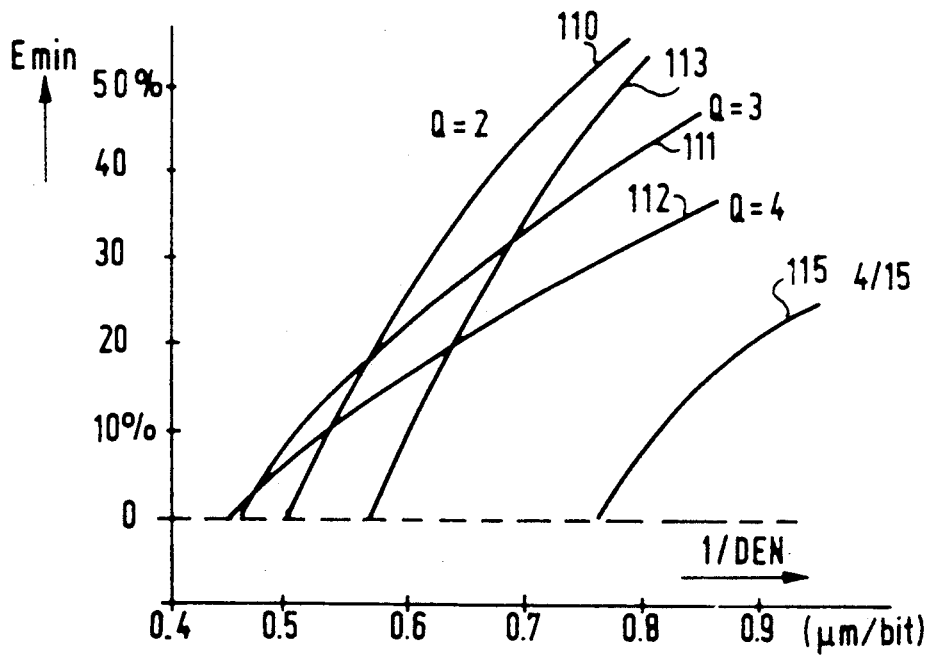
FIG. 11 illustrates the information densities obtained when different codes are used.

FIG. 11 shows the smallest eye openings Emin for a number of difference codes as a function of the inverse of the information density DEN.

The smallest eye opening that occurs is expressed as a percentage of the difference between the maximum signal strength Dmax and the minimum signal strength Dmin of the detection signal Vd. The information density is expressed as a number of $\mu m$ occupied per bit of the information signal Vi.

Figure 12:
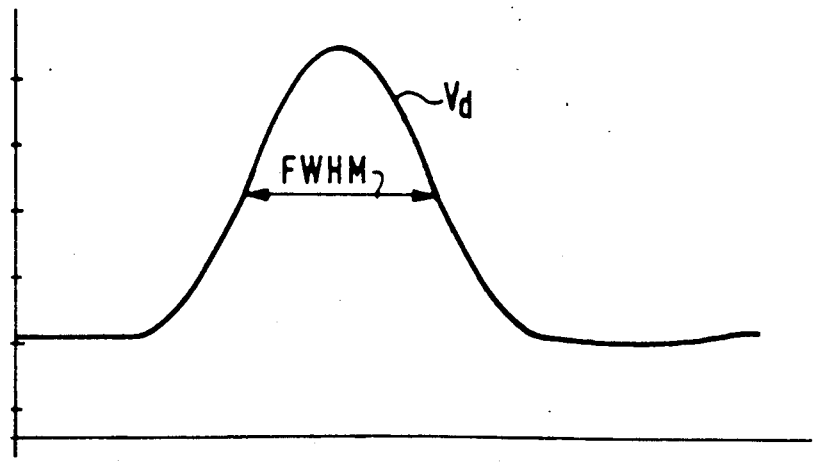
FIG. 12 shows the waveform of the detection signal when an elementary mark is scanned, FIGS. 13A-G, 21A-G, 22A-F, 23A-F, 24A-F and 25A-F give the number of available code words that can be used in different embodiments of the invention, FIGS. 14 and 16, by way of example, give the relation-ships between the information words IW and the code words CW for different embodiments of the inventive method.

The relationships given apply to the case that the FWHM value (full-width half-maximum value) in the detection signal during scanning of a freely situated unitary mark corresponds to 1.0 $\mu m$. By way of illustration FIG. 12 shows the detection signal Vd obtained when the freely situated elementary mark 54 is scanned. In FIG. 12 the dis& placement of the radiation beam relative to the elementary mark 54 is plotted horizontally and the signal strength of the detection signal Vd is plotted vertically. The FWHM value indicates the distance between the points where the signal strength is half the maximum signal strength.

In FIG. 11 the curves 110, 111 and 112 illustrate the relationship between the smallest eye opening Emin and the information density for P is 1 and Q is 2, 3 and 4 respectively.

By way of illustration the curve 113 gives the relationship between the smallest eye opening and the information density if the information signal is recorded without being encoded. The curve 115 gives the information density in the case that the information words are encoded in conformity with the 4/15 code described in GB 2,198,670.

From FIG. 11 it is evident that the class of codes described in the foregoing enable the information density to be increased substantially.

The curves given in FIG. 11 apply to the case that the code signal is encoded in an optimum manner, i.e. the ratio R between the number of information bits and the number of code bits is maximal. If P is 1, this maximum value $\eta$ can be determined by means of the following relationships:

$\eta = \lim 1/n \log_2 N(n,Q)$
$N(n,Q) = 2N(n-1, Q) - N(n-2, Q) + N(n-Q-1, Q)$
(for $n > Q+2$).

If P is not equal to 1, the number N can be found by means of the following relationship:

$N(n,Q,Q) = 2N(n-1,P,Q) - (N(n-2,P,Q) + N(n-P-Q,P,Q)$ (for $n > P+Q+1$)

where n is the number of bits of the code word and N is the number of different code words.

Table 1 gives the maximum ratio (R) for Q=2,3,4 and 5.

TABLE 1

| Q | $\eta$ |
|---|---|
| 2 | 0.8114 |
| 3 | 0.6942 |
| 4 | 0.6125 |

TABLE 1-continued

| Q | $\eta$ |
|---|---|
| 5 | 0.5515 |

In a customary encoding method information words comprising a fixed number of bits, for example 8, are converted into code words comprising a fixed number of bits.

In order to enable the length of the code words to be determined Table 2 gives the number of different code words as a function of the number (n) of bits of the code word for Q=2,3,4 and 5.

TABLE 2

| n | Q = 2 | Q = 3 | Q = 4 | Q = 5 |
|---|---|---|---|---|
| 1 | 2 | 2 | 2 | 2 |
| 2 | 4 | 4 | 4 | 4 |
| 3 | 7 | 7 | 7 | 7 |
| 4 | 12 | 11 | 11 | 11 |
| 5 | 21 | 17 | 16 | 16 |
| 6 | 37 | 27 | 23 | 22 |
| 7 | 65 | 44 | 34 | 30 |
| 8 | 114 | 72 | 52 | 42 |
| 9 | 200 | 117 | 81 | 61 |
| 10 | 351 | 189 | 126 | 91 |
| 11 | | 305 | 194 | 137 |
| 12 | | | 296 | 205 |
| 13 | | | | 303 |

Figures 21A, 21B:
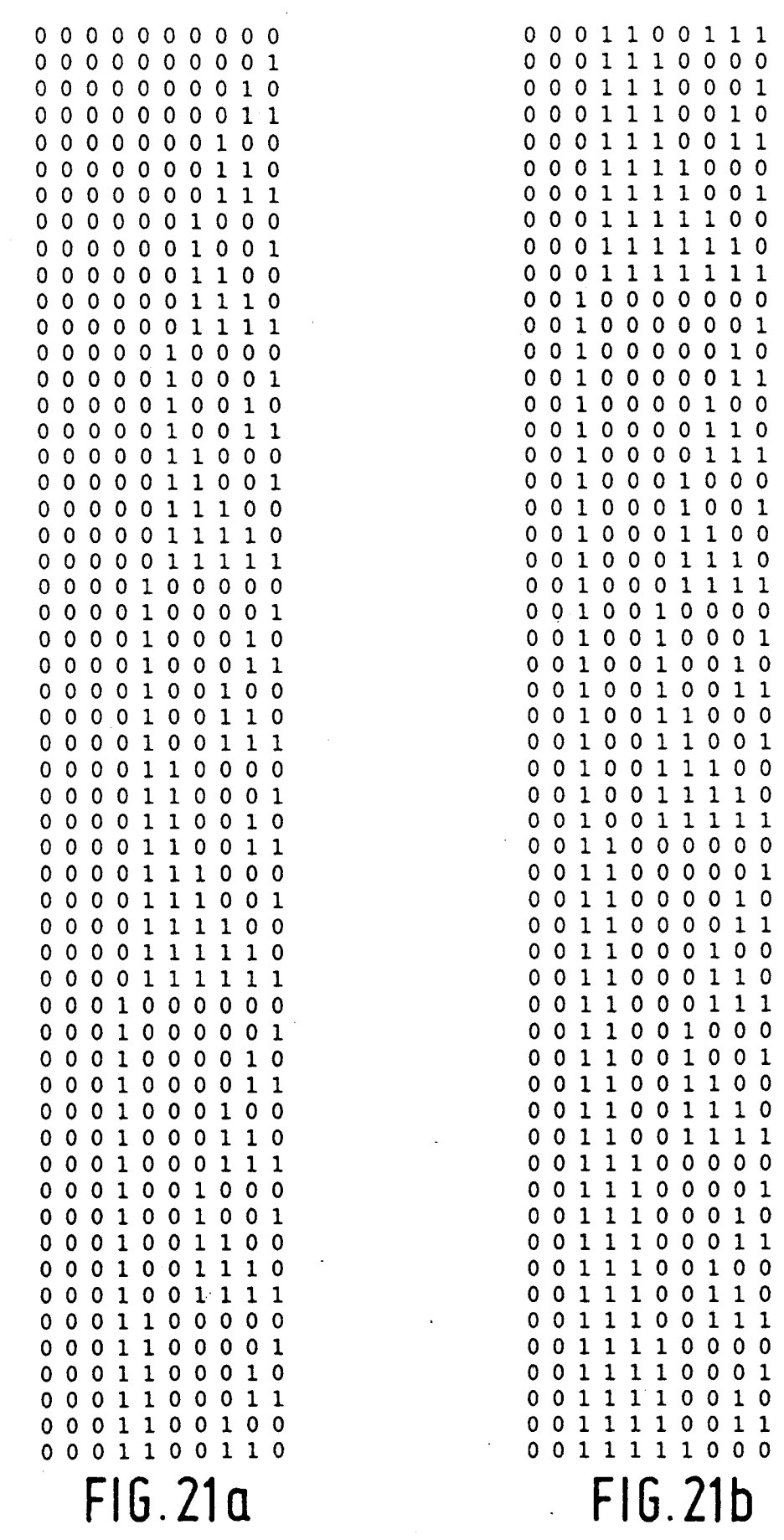
Figure 21C:
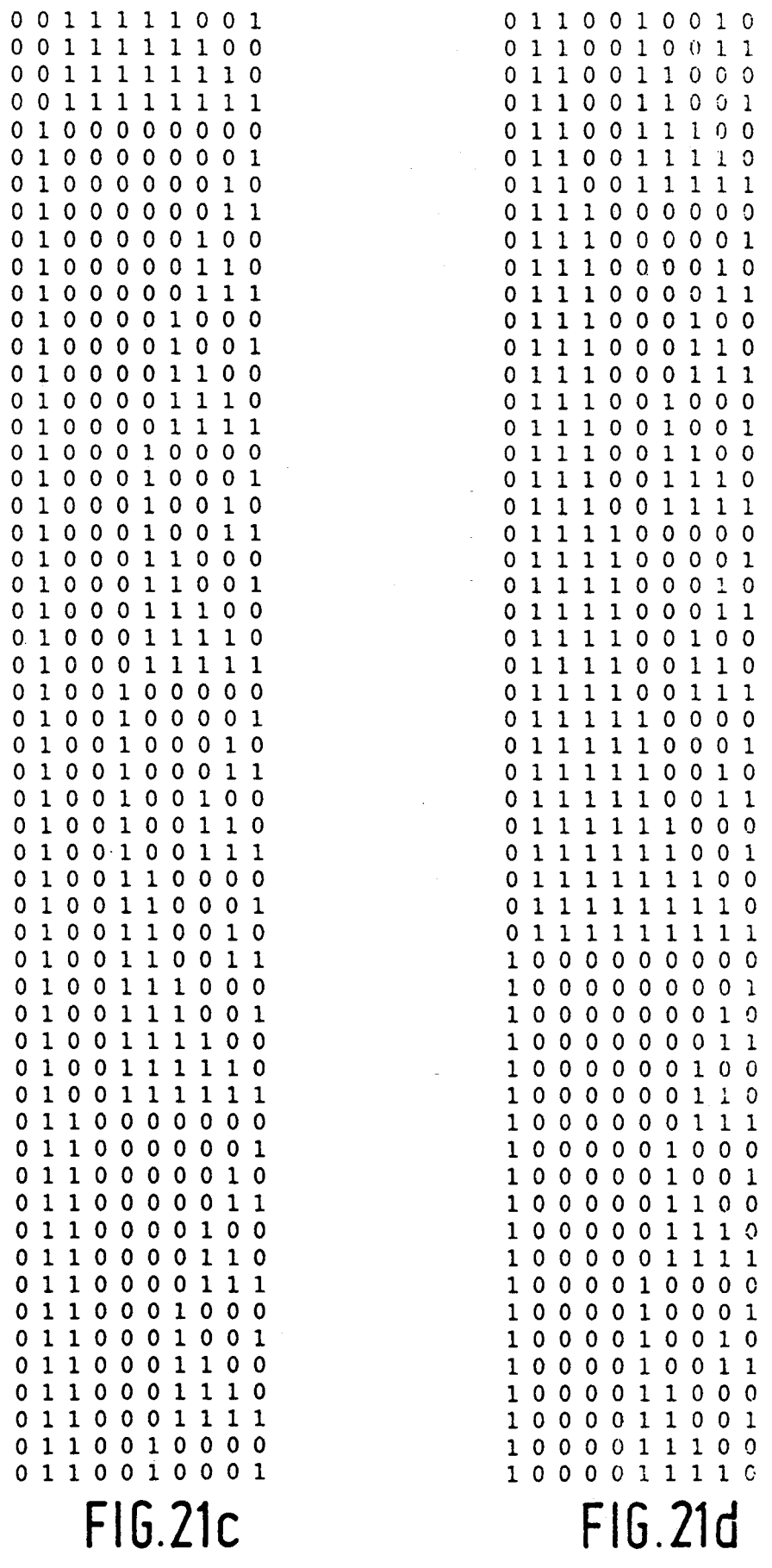
Figure 21E:
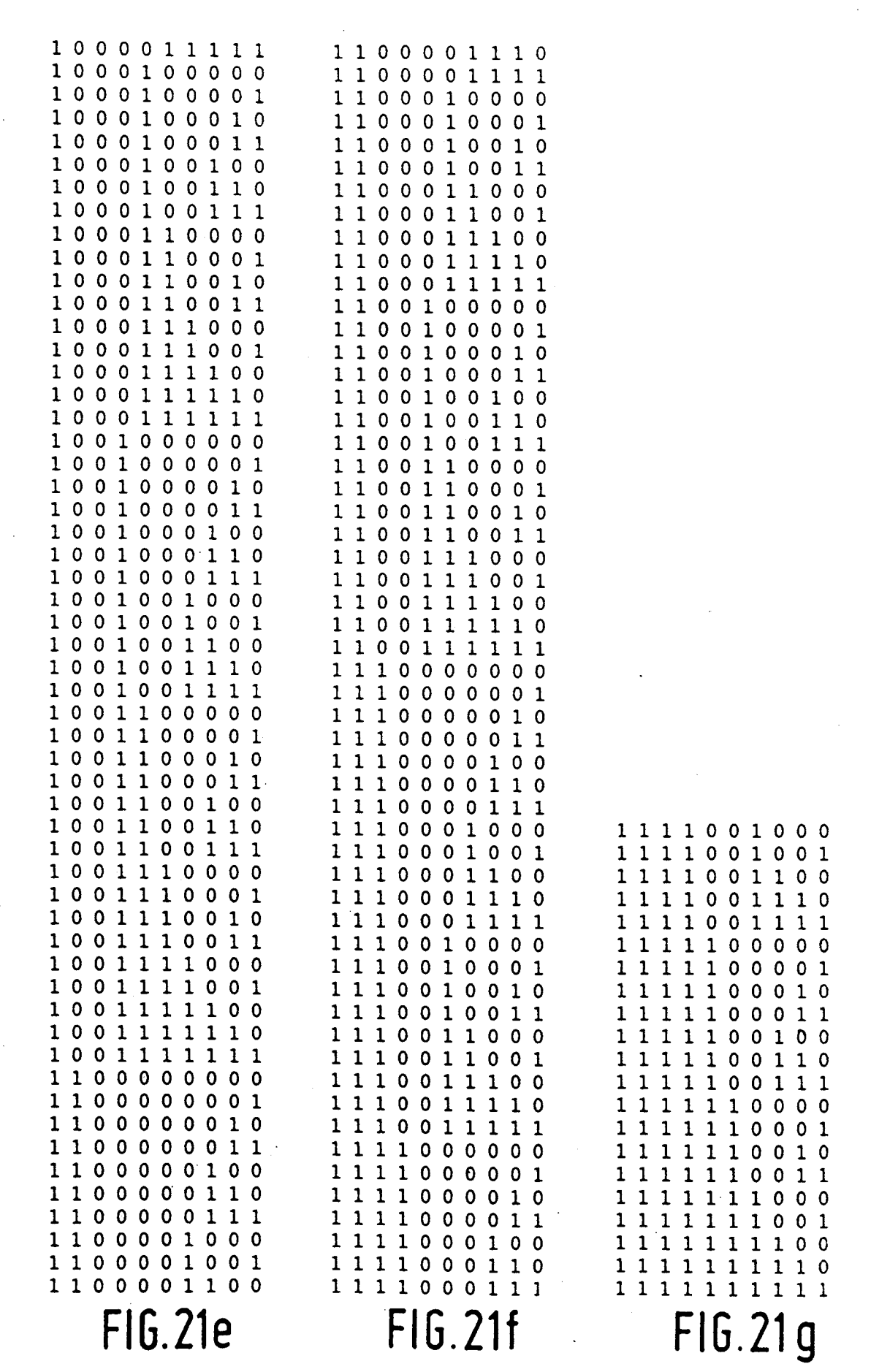
Figures 22A, 22B, 22C:
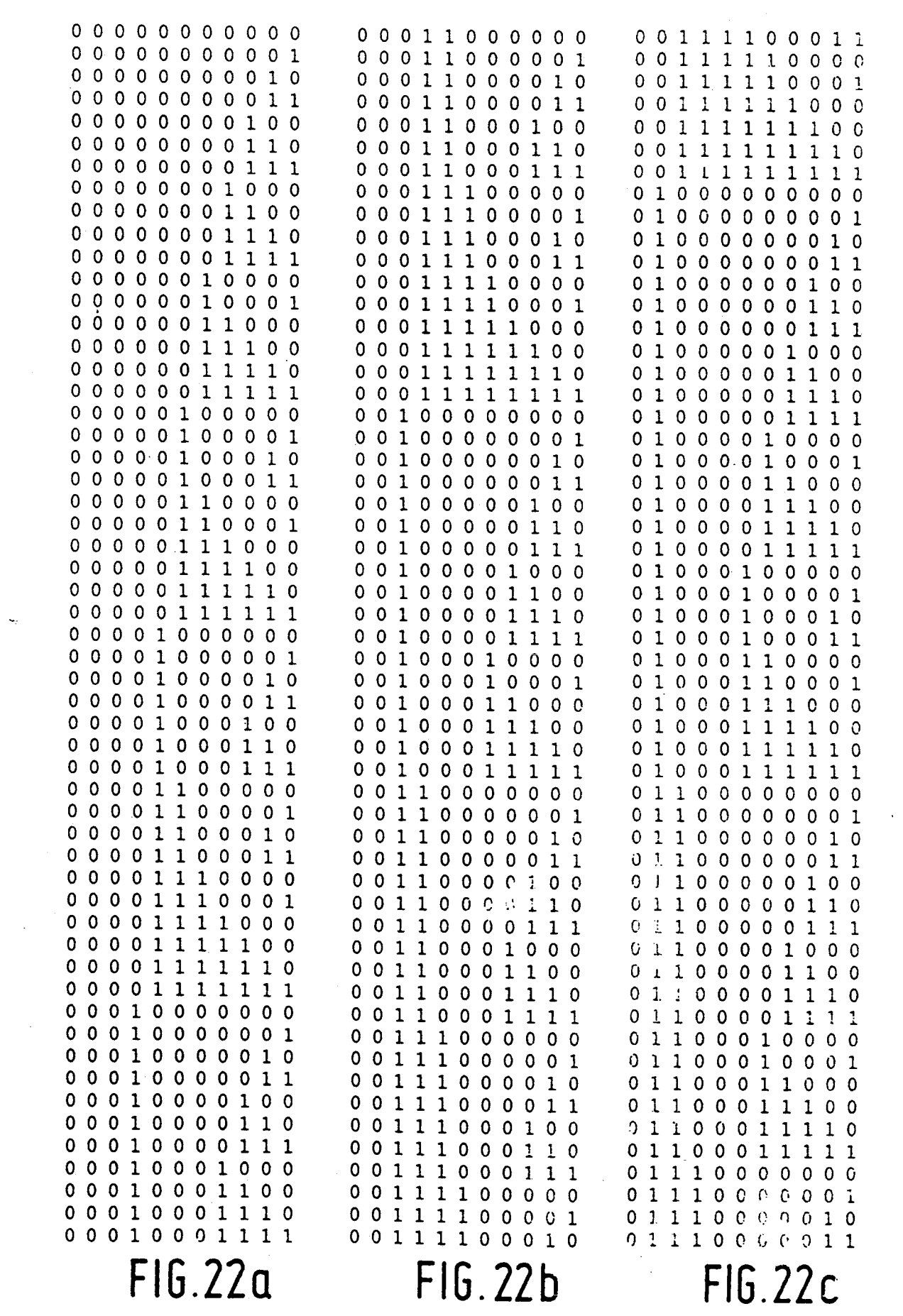
Figures 22D, 22E, 22F:
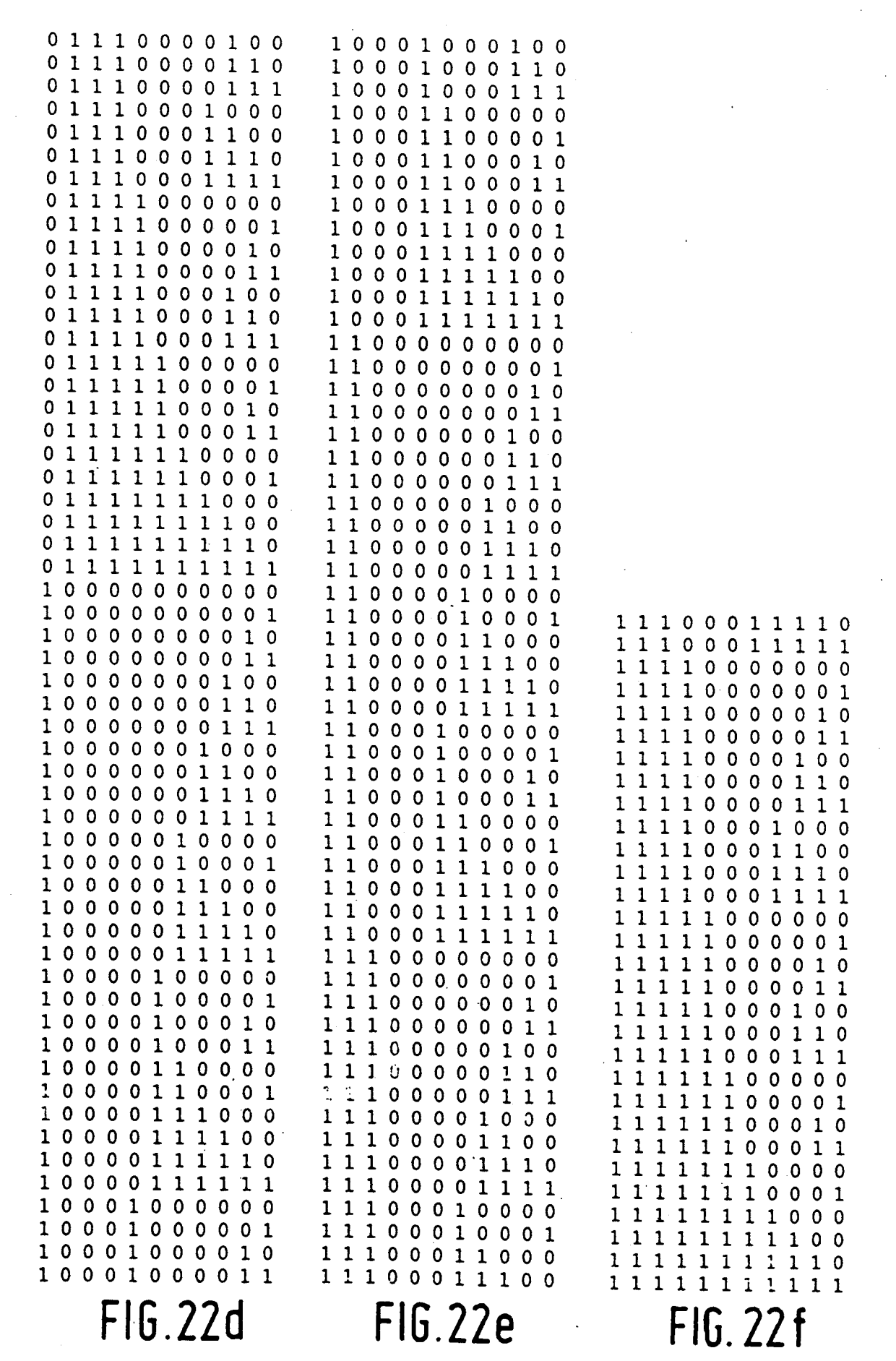
Figures 23A, 23B, 23C:
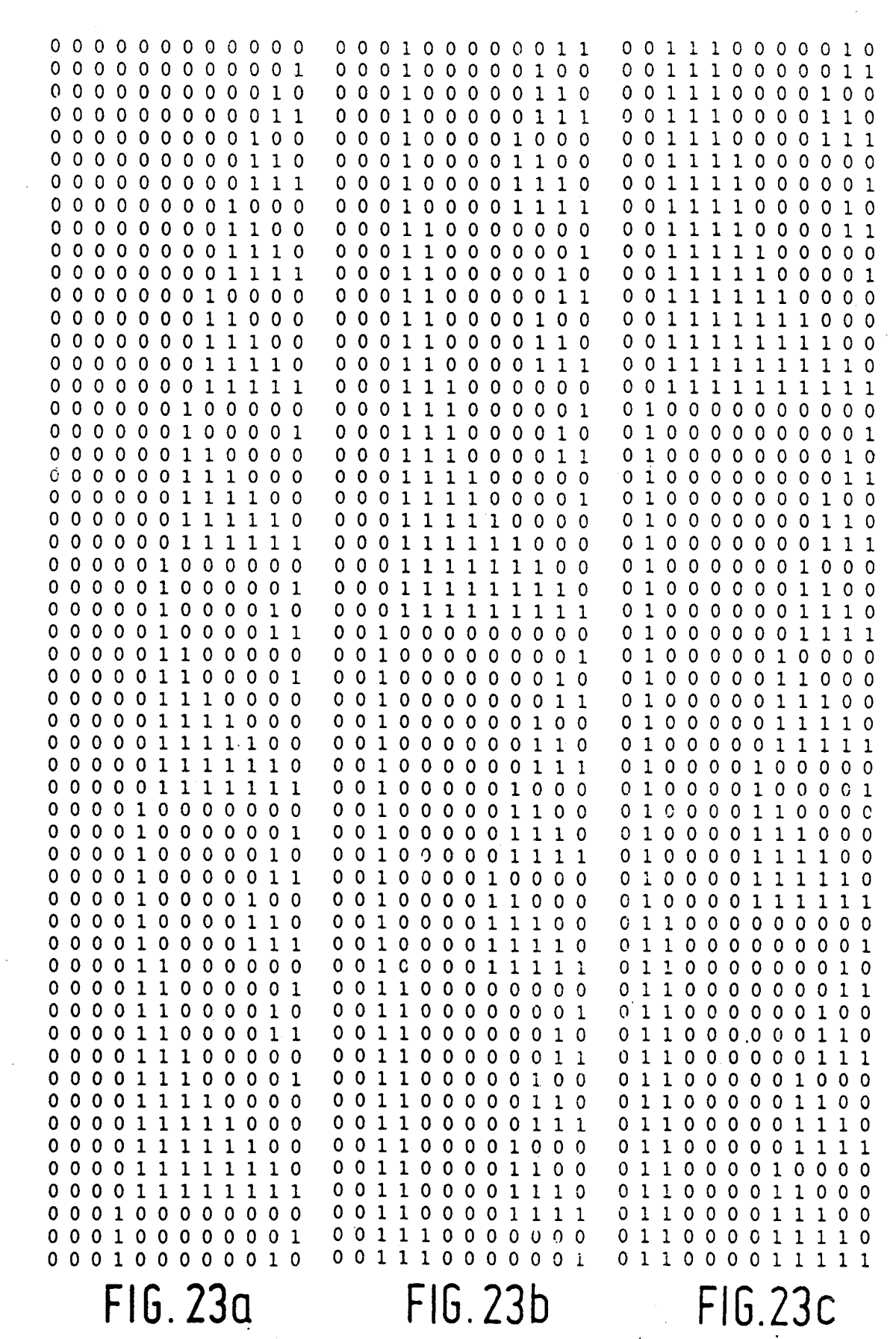
Figures 23D, 23E, 23F:
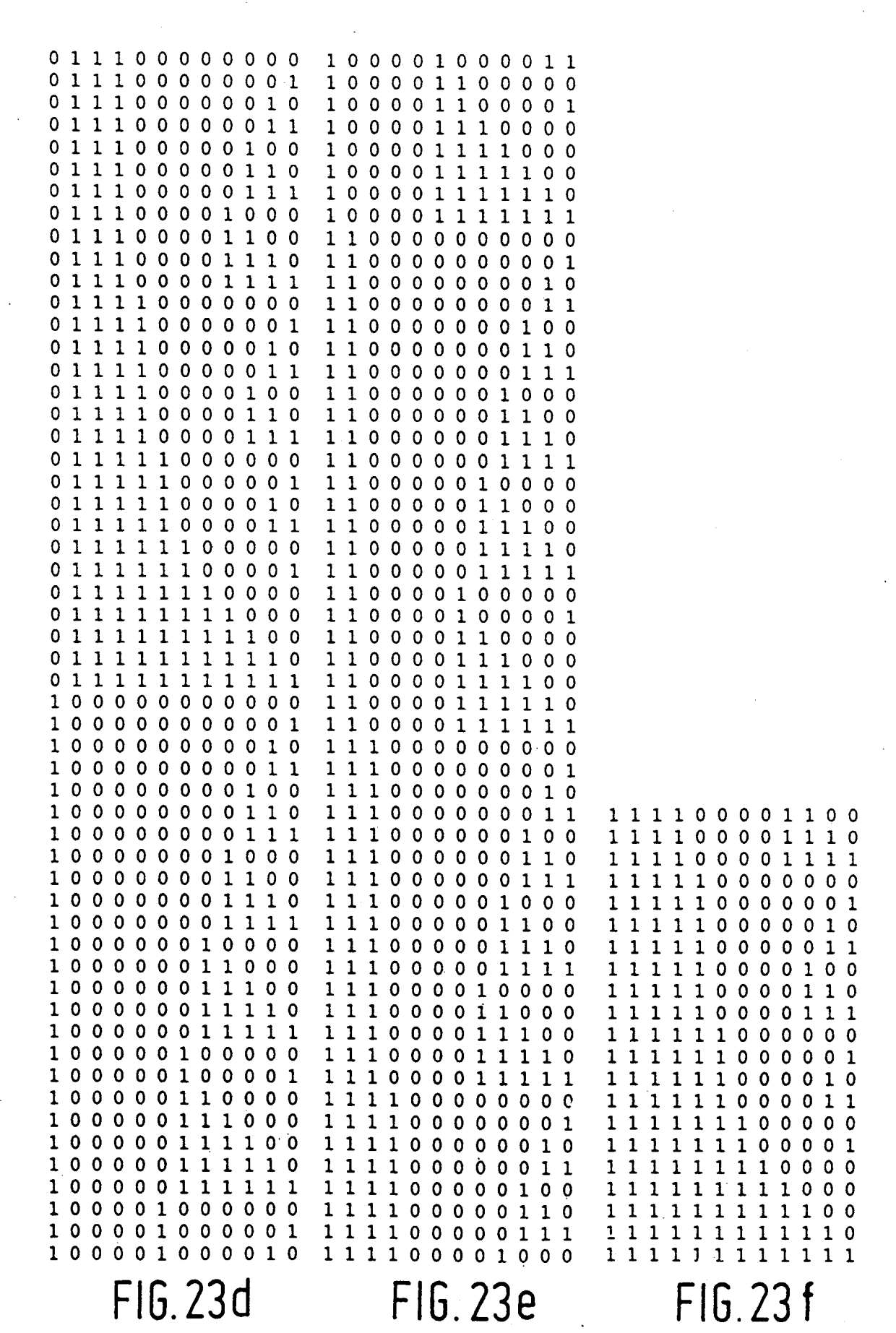

From Table 2 it appears that if the length of the information word is 8 bits (and Q is 2, 3, 4 or 5) the length of the code word must be at least 10, 11, 12 or 13 bits to enable a unique code word to be assigned to each of the 256 different 8-bit information words. By way of illustration FIGS. 21, 22 and 23 give all the available code words for (n=10, Q=2) (n=11, Q=3) and (n=12) Q=4) respectively. The number of available code words in FIGS. 21, 22 and 23 is always greater than the 256 needed in the case that the information words are 8 bits long, so that a unique code word can be assigned to each information word.

In addition to the requirement that the number of successive "0" bits within the code word should be at least Q, it is often also desirable that the number of successive "0" bits at the boundaries between two successive code words should also be at least Q. This requirement can readily be met by adding a number of Q "0" bits to every code word. For Q=2 this means that every 8-bit information word is converted into a 12-bit codeword.

The ratio between the number of information bits and the number of code bits then becomes 8/12=0.666.

This means that the information density on the record carrier becomes 18% lower than the information density indicated in FIG. 11 for Q=2. The information density is then slightly lower than the information density in the case that the information signal is recorded without being encoded. Nevertheless, it is preferred to apply encoding because not all the available code words are needed for recording. The code words which are not used can then be employed as control words, for example synchronization codes.

A higher value for R can be attained if only 1 bit is added to the code, the logic value of the additional bit depending on the first bit of the next code word and the last bit of the preceding code word in such a way that the minimum requirement for the number of successive "0" bits is always met.

However, this method has the disadvantage that it results in an increased complexity of the encoding and decoding circuits.

Another solution to reduce the number of code bits is to allow only code words which begin with P "1" bits or with Q "0" bits and which moreover end with P "1" bits or with Q "0" bits. Hereinafter such a code will be referred to as a concatenatable code.

For P=1 the number N meeting this requirement can be derived from the following relationship $$N(n+Q'1,Q)=N(n,Q) \qquad (2)$$

This means that when 8-bit information words are used and Q is 2, 3, 4 or 5 this yields an 11-bit, 13-bit, 15-bit and 17-bit concatentable code respectively.

Figures 13A, 13B:
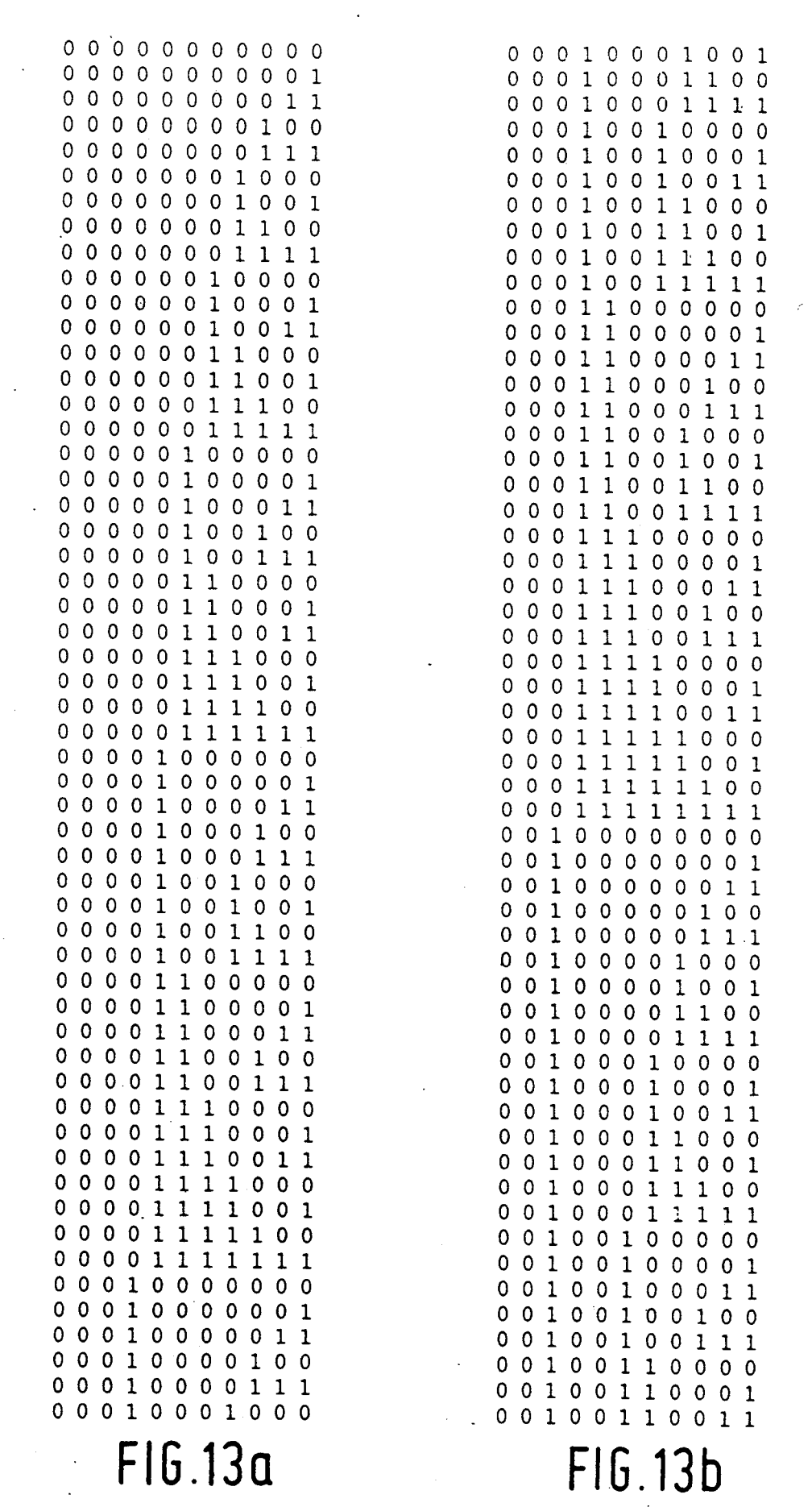
Figures 13C, 13D:
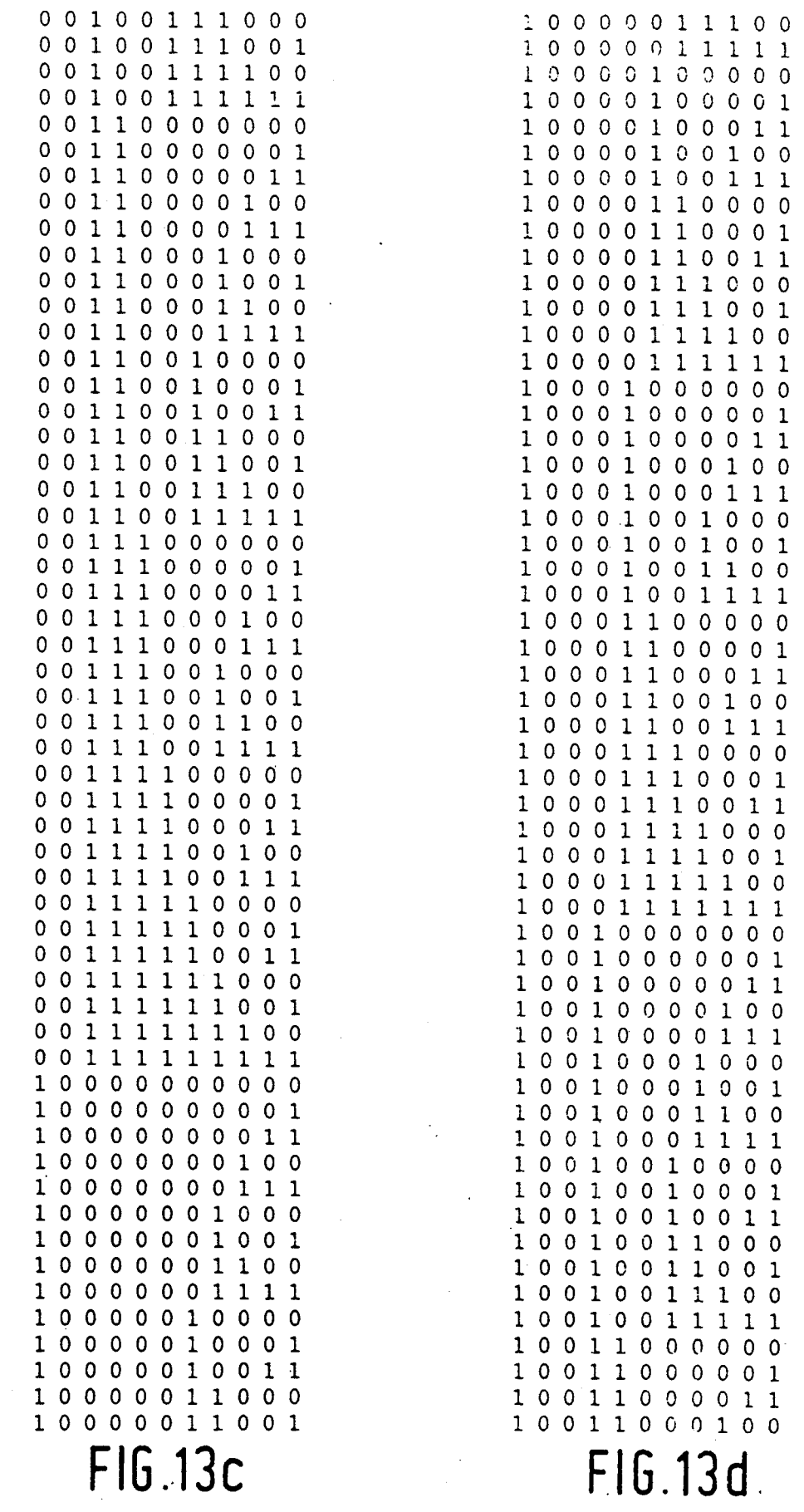
Figure 13E:
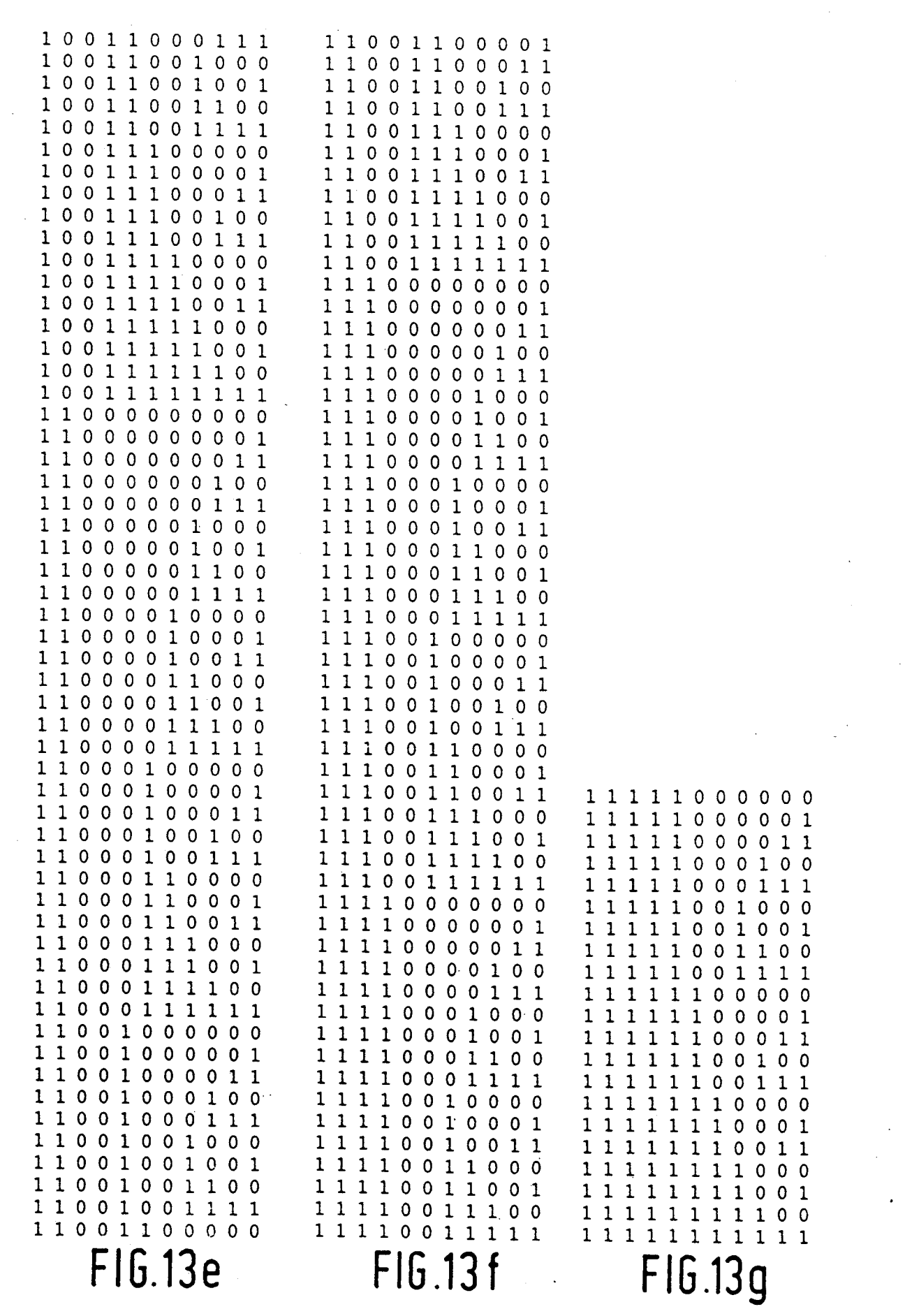

FIG. 13 shows all the different (351) concatentable code words for Q=2 and 8-bit information words. From these code words 256 code words can be selected. Furthermore, FIGS. 24 and 25, by way of illustration, show all the available concatenatable words for (Q=3, n=13) and (Q=4, n=15) respectively.

Figures 24A, 24B:
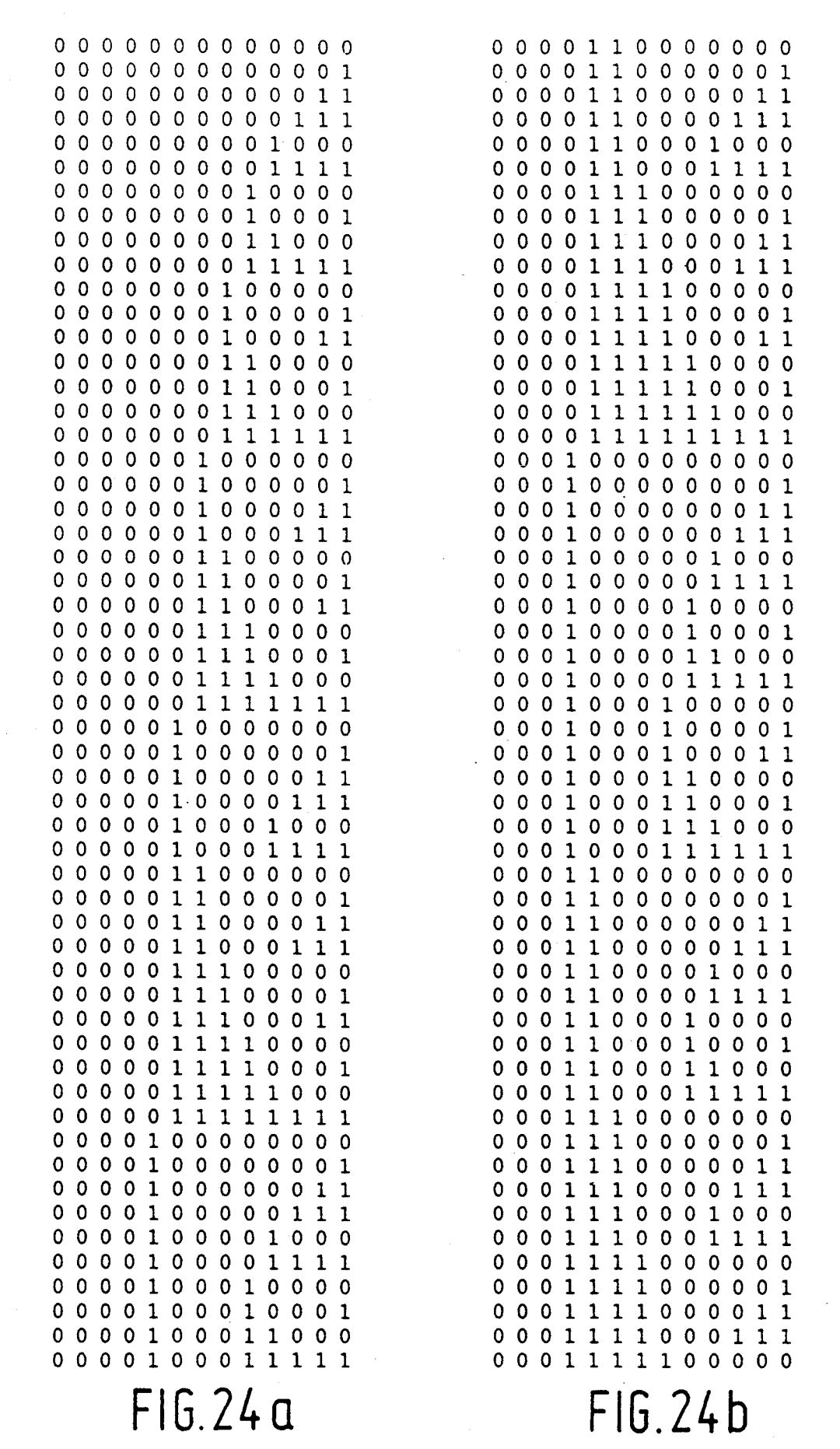
Figures 24C, 24D:
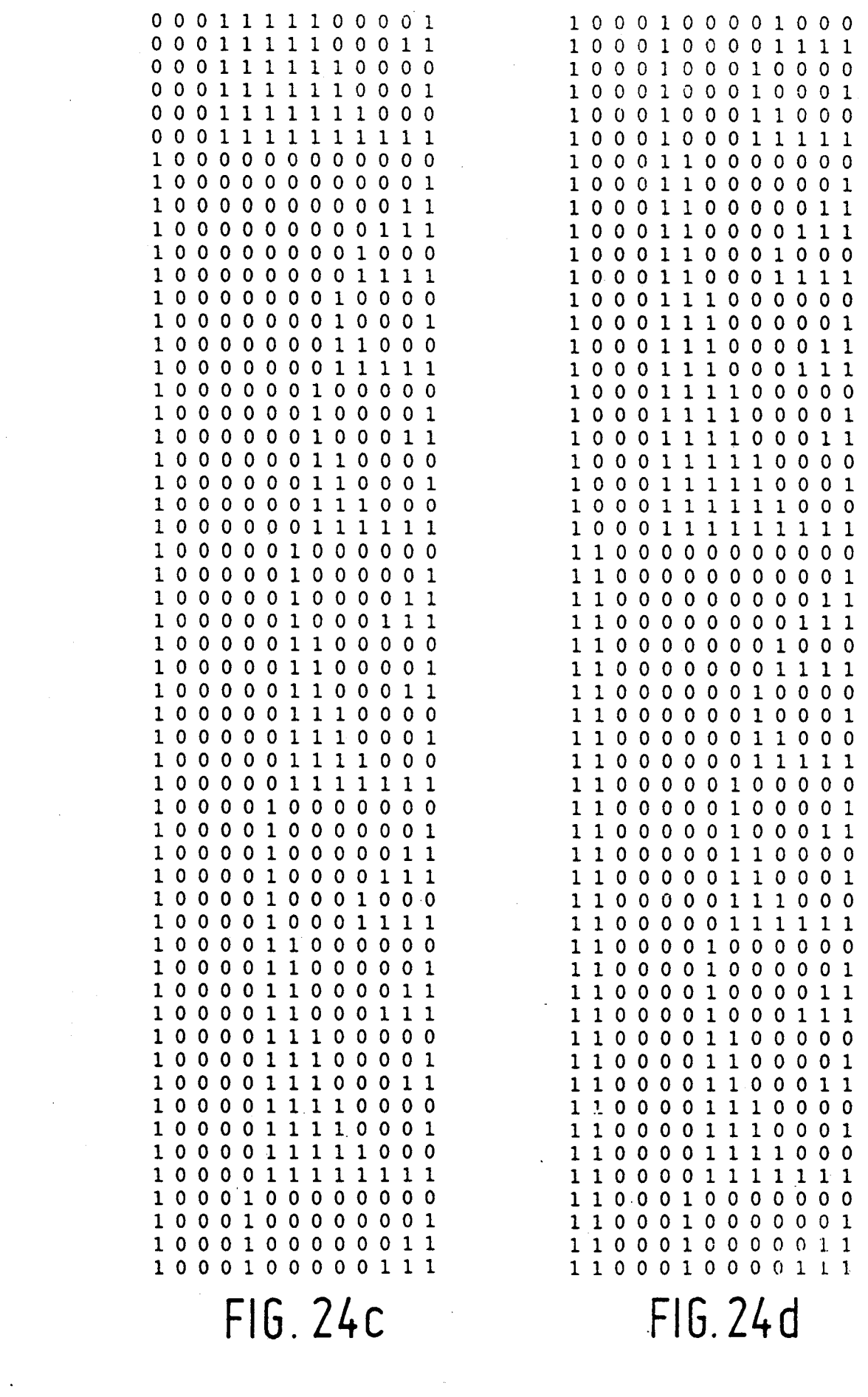
Figures 24E, 24F:
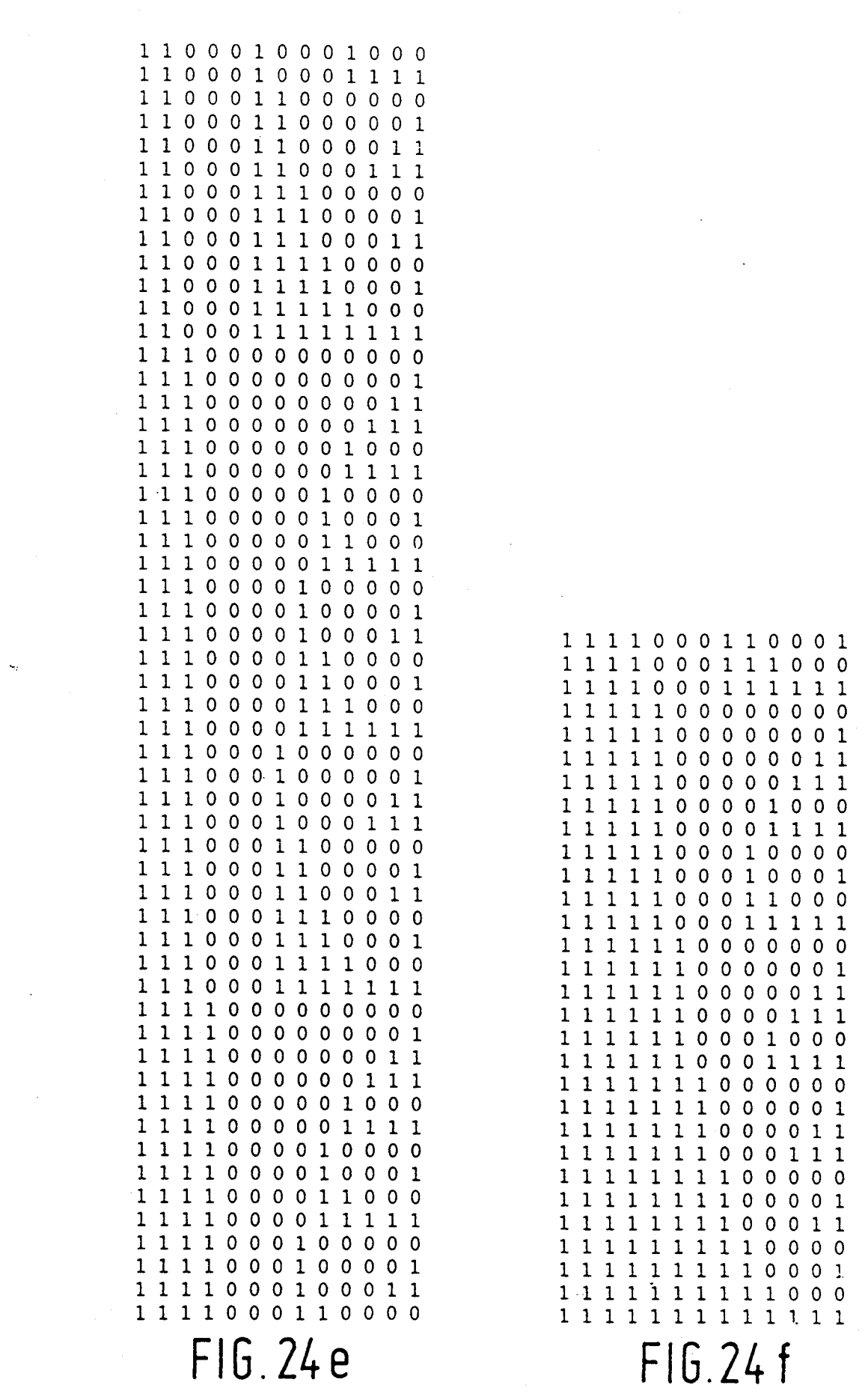
Figures 25A, 25B:
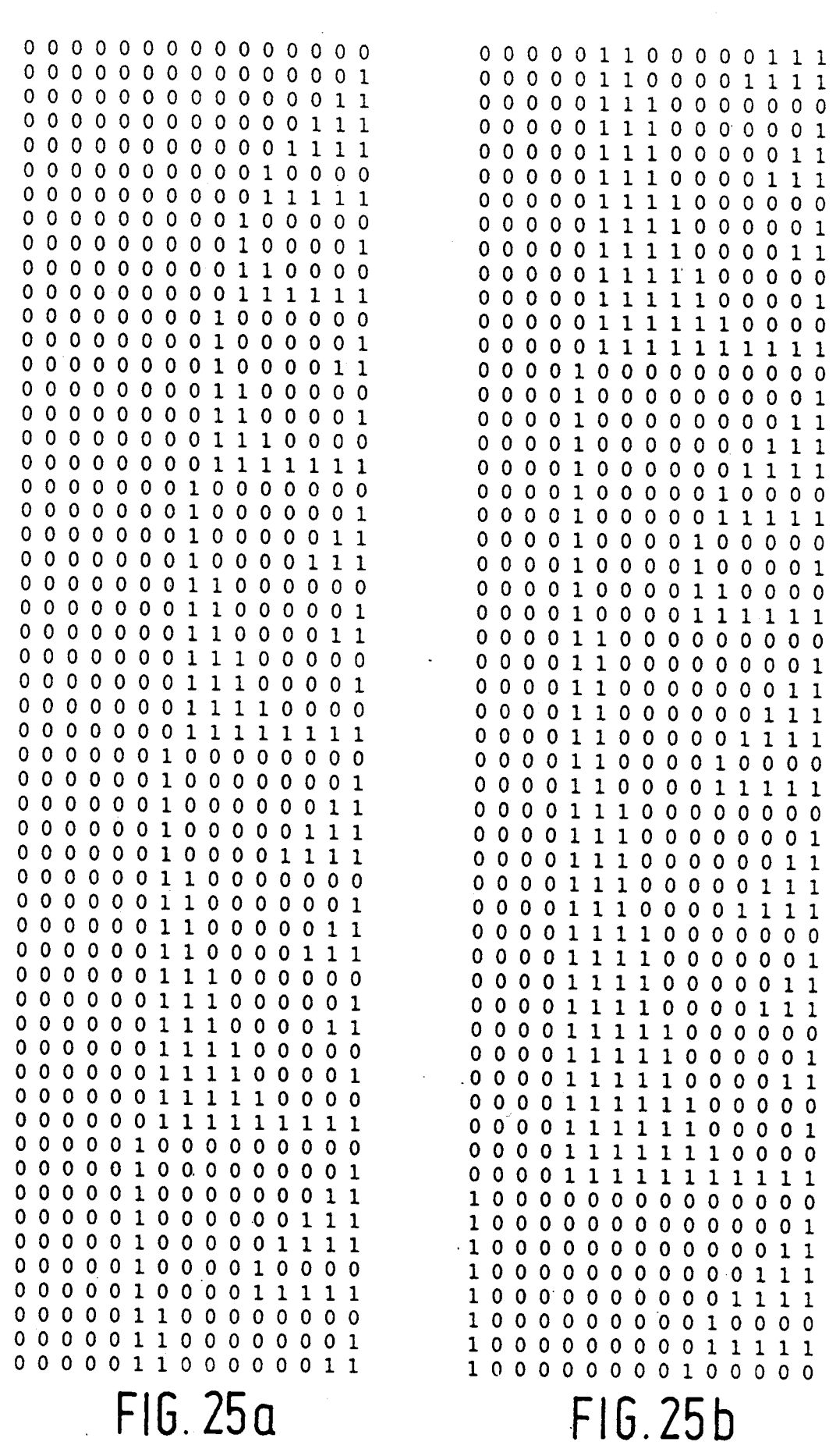
Figures 25C, 25D:
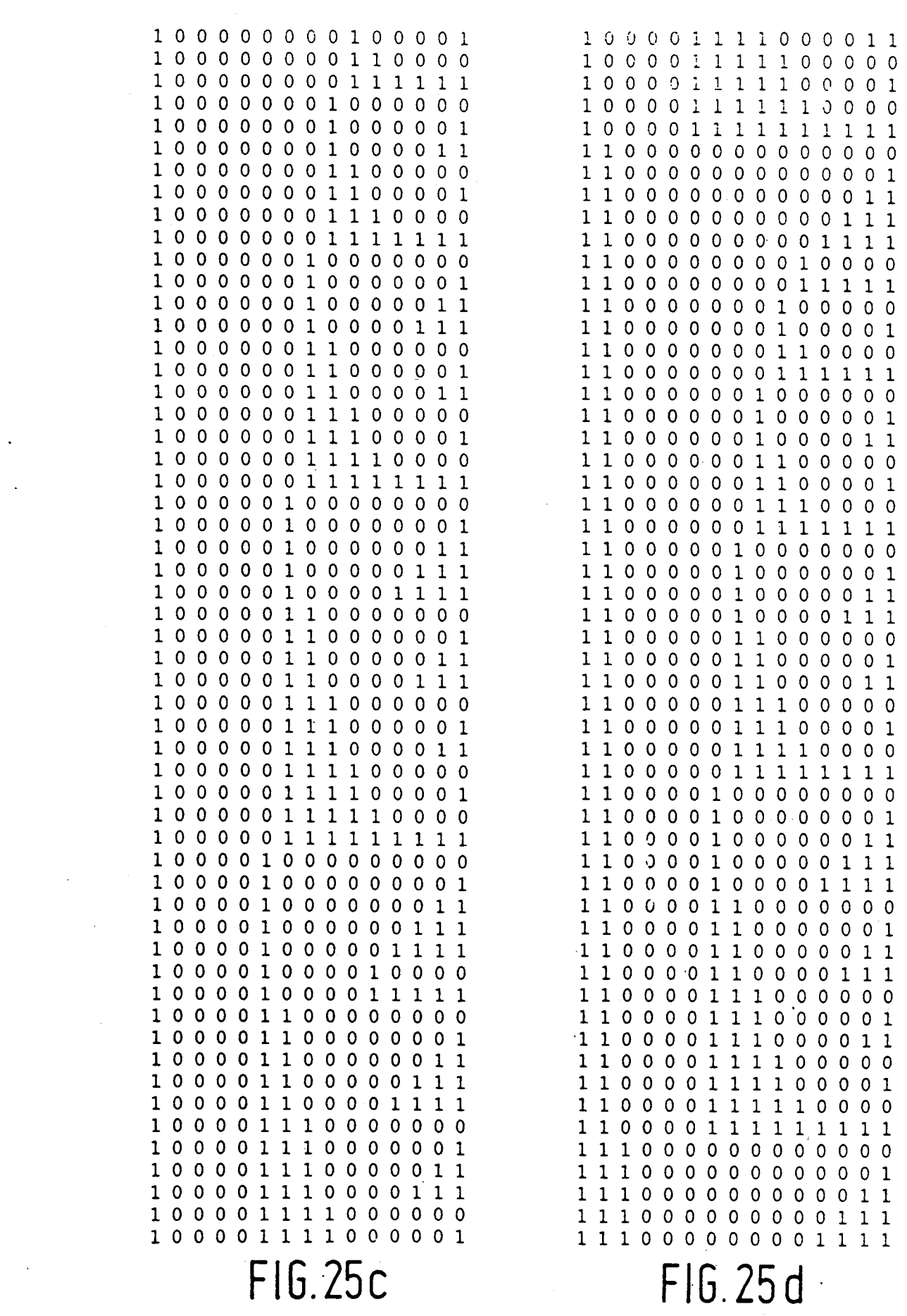
Figures 25E, 25F:
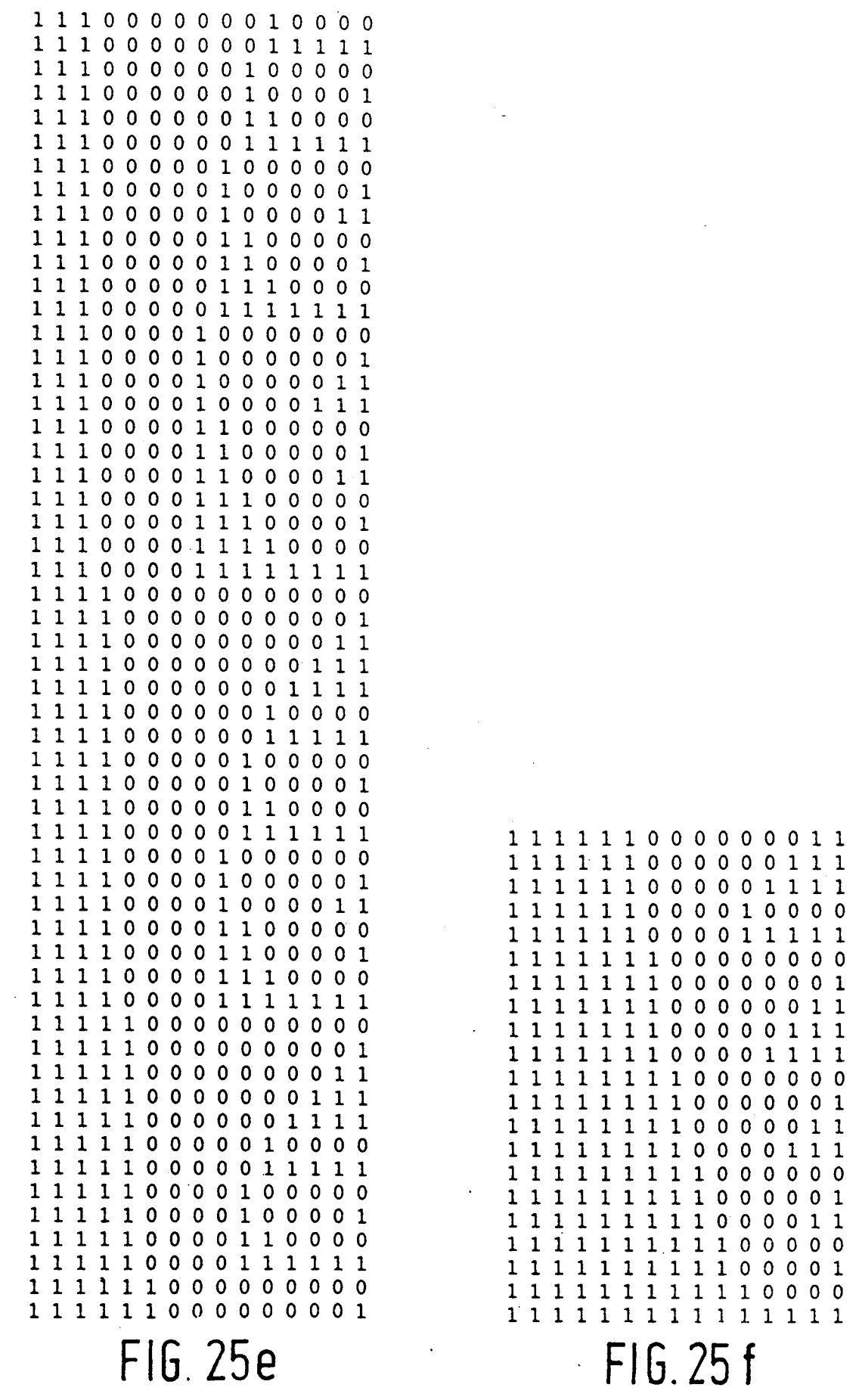

The number of different codewords in FIG. 24 is 305 and the number of different codewords in FIG. 25 is 296 (see also Table 2). A class of codes with a ratio R which lies even closer to the maximum value will be described hereinafter for the case that Q is 2.

For this code the information signal is divided into 4-bit words. A first group of 4-bit information words is mapped onto concatenatable 5-bit code words. It follows from Table 2 and relationship 2 that there are 12 different concatenatable 5-bit code words. Since there are 16 different 4-bit information words this means that no 5-bit code word is available for four 4-bit information words. During encoding these residual 4-bit information words are combined with another 4-bit information word to form an 8-bit information word. The number of different 8-bit information words is $4 \times 24 = 64$. These 8-bit information words are mapped onto 10-bit concatenatable code words, of which there are 200 different ones (in accordance with Table 2). However, the combinations of code words which can be formed from the 5-bit concatenatable code words cannot be used, so that only 56 10-bit concatenatable code words can be used for mapping 8-bit information words. This means that eight 8-bit information words remain. These 8-bit information words are combined with a 4-bit information word, yielding 12-bit information words. The number of different 12-bit information words is $8 \times 24 = 128$. These 12-bit subwords are mapped onto 15-bit concatenatable code words, of which there are 3329. The 15-bit code words formed by the 5-bit concatenatable code words already used and the 10-bit concatenatable code words cannot be employed for this. There are 3072 such words, so that 256 15-bit concatenatable code words are available, which is amply sufficient for mapping the 128 12-bit information words.

The code described in the foregoing will be referred to hereinafter as a synchronous code. In this synchronous code the ratio R between the number of information bits and the number of code bits is 0.8, so that the maximum value ($\eta$) of 0.8114 is closely approximated.

In the same way as in the foregoing, a synchronous code can be found for Q=3, for which subwords of 2, 4 or 6 bits are mapped onto 3, 6 or 9-bit concatenatable code words FIG. 14 gives the 2, 4 and 6-bit information words (IW) into which the information signal can be divided and the associated 3, 6, and 9-bit code words (CW) for Q=3.

FIG. 15, by way of illustration, shows the division into 2, 4 and 6-bit information words for an arbitrary information signal Vi. FIG. 15 also gives the resulting code signal Vc. The first information word IW1 comprises the combination "00", which is converted into the 3-bit code word "000". The first 2 bits of the information signal which directly follow the 2-bit information word IW1 comprise the bit combination "10", for which no 3-bit code word is available. Subsequently, the combination "10" is combined with the following 2-bit combination, yielding the combination "1011", for which no code word is available either. After this the combination is again extended by two bits, yielding the bit combination "101100". This combination is a permissible 6-bit information word (IW2), which is converted into the code word CW2 having the bit combination "000010001". In a similar way the remainder of the information signal is divided into the information words IW3, IW4, IW5, IW6 and IW7. The boundaries between the code words can be determined as follows. Firstly, the code signal Vc is divided into 3-bit groups, from which the 3, 6, or 9-bit code words can be derived. Since the code words are concatenatable, the boundary between two successive 3-bit groups forms a code word boundary if first 3-bit groups end with one "1" bit (P=1) or with three "0" bits (Q=3) and, in addition, the second 3-bit group begins with one "1" bit or with three "0" bits. These combinations (000.1; 1.000; 000.000; 1.1) do not occur at the boundaries between 3-bit groups situated within the code words. This is because in selecting the 6 and 9-bit code words, the requirement is to be met that they cannot be formed from combinations of concatenatable 3-bit and/or 6-bit code words already used.

The ratio R between the number of information bits and the number of code bits in the last-mentioned synchronous code is 0.6667, which value closely approximates to the maximum attainable value ($\eta$) of 0.6942. FIG. 16 also gives a synchronous code for Q=5.

Figures 17A, 17B:
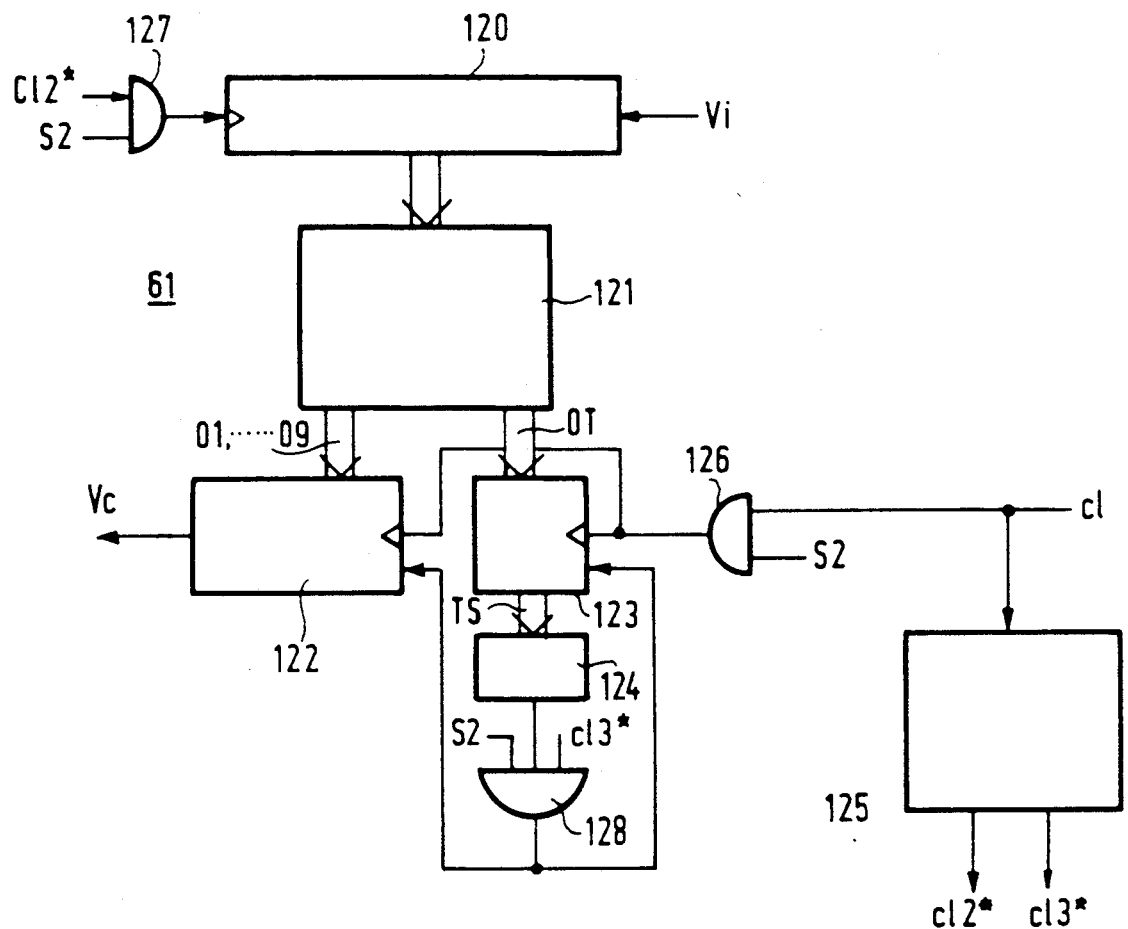
FIG. 17a shows an embodiment of the encoding circuit in accordance with the invention.
FIG. 17b illustrates the relationship between the input signals and output signals of the memory used in the encoding circuit.

FIG. 17a shows an embodiment of an encoding circuit 61 for synchronous encoding. The encoding circuit 61 comprises a 6-bit serial-parallel converter 120 controlled by a clock signal $c12^x$, whose output signals on the parallel outputs are applied to the address inputs A1, ...A6 of a memory 121, for example a read-only memory. The outputs signals of the memory 121 are divided into two groups. A first group of output signals 01, ..., 09 is applied to the parallel inputs of a parallel-serial converter 122 controlled by the clock signal c1. This group of output signals 01, ..., 09 represents the code words. A second group of output signals TO is applied to the parallel inputs of a DOWN counter 123 controlled by the clock signal c1. This second group of output signals represents a code indicating the number of bits of the output code word.

FIG. 17b illustrates the relationship between the address signals A1, ..., A6, the output signals 01, ...,09 and the output signals TO. The count of the DOWN counter 123 is applied to a count detector 124, which when the count "0" is reached produces a logic "1" signal which is applied to an input of a three-input AND gate 128. The clock signal $c13^x$ and the signal S2 are applied to the other inputs of the AND gate 128.

The output of the AND gate 128 functions as the load signal for the parallel-serial converter 122 and the DOWN counter 123.

The encoding circuit 61 further comprises a control circuit 125, which in a customary manner derives the clock signals $c12^x$ and $c13^x$ from the clock signal c1. The relationship between the clock signals c1, $c12^x$ and $c13^x$ is given in FIG. 17c. The frequencies of the clock signals $c12^x$ and $c13^x$ are equal to $\frac{2}{3}$ and $\frac{1}{3}$ times the frequency of the clock signal c1. Further, t1, ....,t4 indicate a number of instants within the period of c1.

The encoding circuit 61 further comprises AND gates 126 and 127 for inhibiting the respective clock signals c1 and $c12^x$ if the signal S2 is "0".

Figures 17C, 17D:
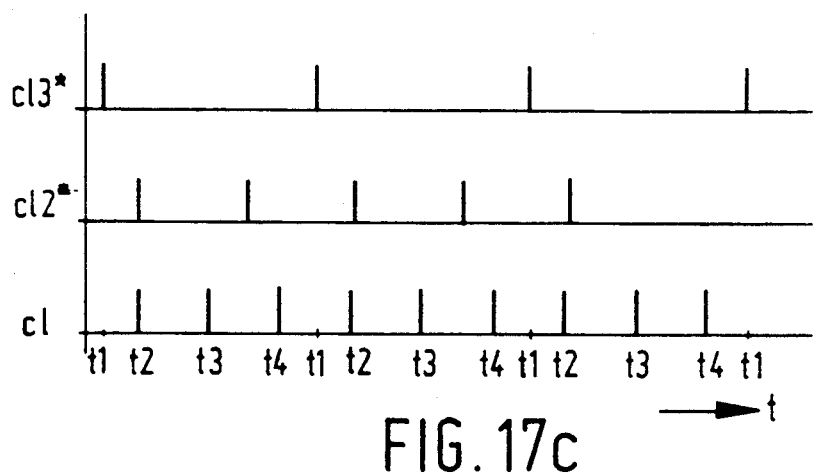
FIGS. 17c and 17d show a number of signal waveforms appearing in the encoding circuit.

The encoding circuit 61 operates as follows. In response to the clock pulses of the clock signal $c12^x$ the information signal Vi is read in. It is now assumed that at the instant t4 the count TS is zero and the bits b1, ...,b6 of the information word read into the converter 120 is "001011" (this situation is indicated on the first line of FIG. 17d). Upon the next clock pulse $c13^x$ the code word "000", which is determined by bits b1 and b2 in the converter 120, is applied to the parallel -serial converter 122. Moreover, the DOWN counter 123 is loaded with the count "3". Upon every clock pulse c1 the code bits c2, ...,c9 in the parallel-serial converter 122 are shifted by one position and the bit c1 is read out as a code-signal bit. In the meantime the bits of the information signal Vc are loaded into the serial-parallel converter 120 at $\frac{2}{3}$ of the frequency with which the code-signal bits are output, so that for every three code bits read out two information bits are read in. As soon as all the bits of the code words in the converter 122 have been read out, the count of the DOWN counter 123 has become zero and the converter 122 is loaded with a new code word whose length depends on the bit combination b1, ...,b6 in the converter 120. In this way the information signal shown in FIG. 15 is converted into the associated code signal Vc, as is shown in FIG. 17d.

Figures 18, 18A:
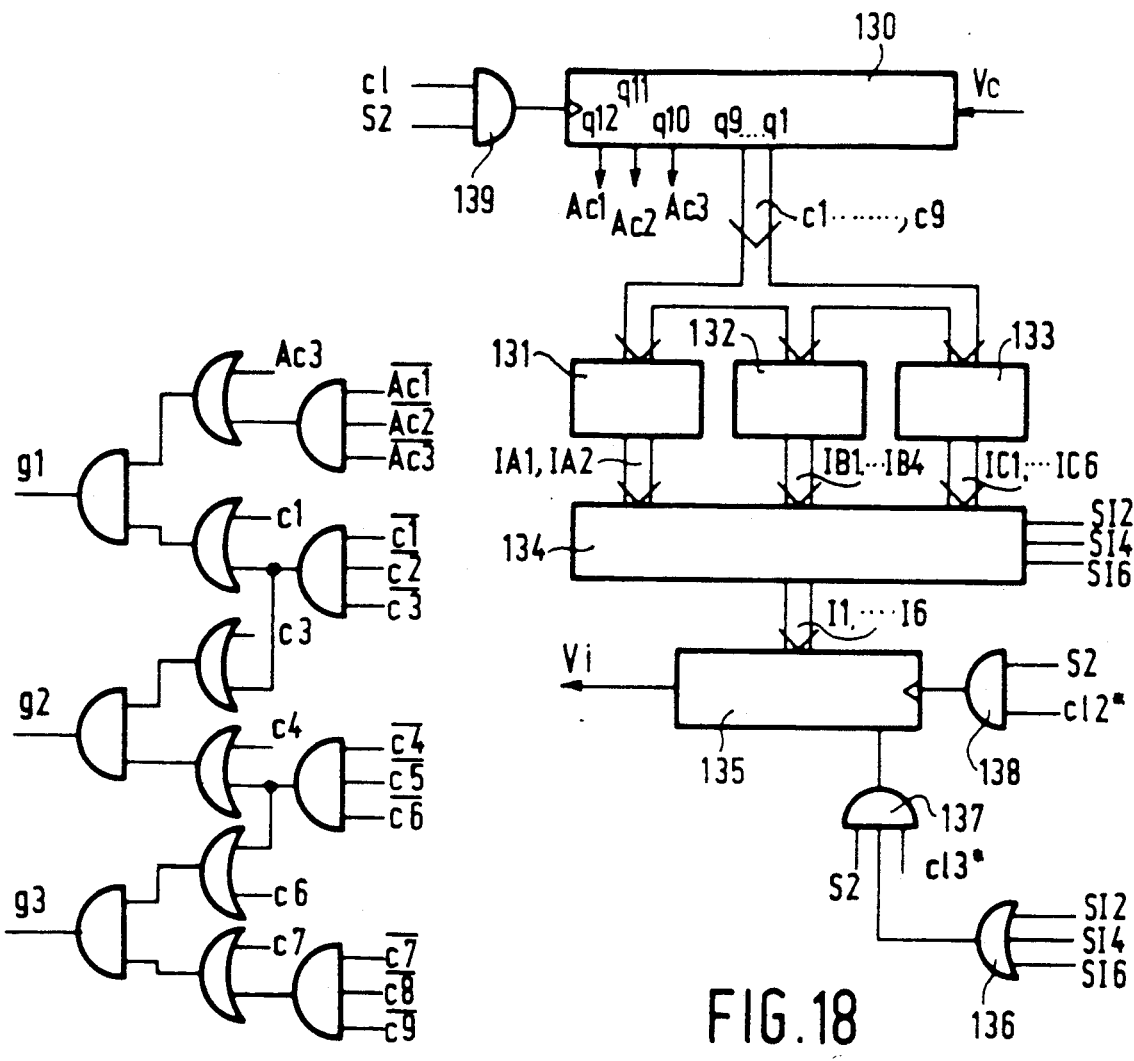
FIG. 18a-18d show an embodiment of the decoding circuit in accordance with the invention.
Figure 18:
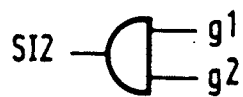

FIG. 18 shows an embodiment of a decoding circuit 57 for decoding a synchronously encoded code signal Vc.

The decoding circuit 57 shown comprises a circuit (not shown in FIG. 18) for generating the clock signals $c12^x$ and $c13^x$ similar to the control circuit 125 described for the encoding circuit. The decoding circuit 57 further comprises a 12-bit serial-parallel converter 130 for the serial input of the code signal Vc under control of the clock signal c1. The signals on the parallel outputs q1, ...., q12 are divided into two groups. The first group comprises the output signals Ac1, ...., Ac3 on the outputs q12, ...., q10. The second group comprises the output signals c1, ...., c9 on the outputs q9, ...., q1.

Figures 19A, 19B, 19C, 20:
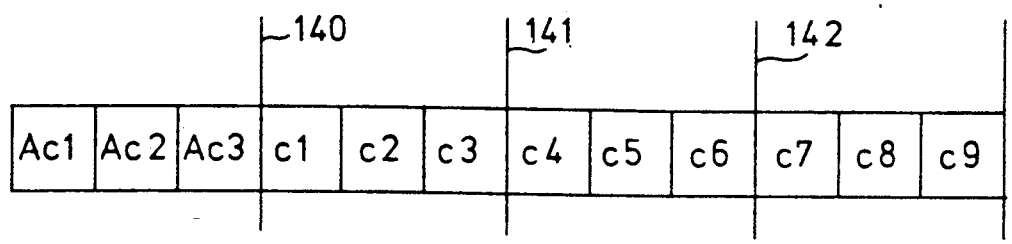
FIG. 19A-C illustrate the relationship between the input signals and the output signals of the memory used in the decoding circuit.
FIG. 20 shows possible boundaries between the code words of the recovered code signal VO' appearing in the serial-parallel converter of the decoding circuit.

The signals c1, c2, c3 are applied to a memory 131, for example a read-only memory, as address signals. The signals c1. ..., c6 are applied to a second memory 132 as address signals. The signals c1, ..., c9 are applied to a third memory 133 as address signals. The relationship between the address signals and the respective output signals IA, IB, IC of the memories 131, 132, 133 are given in FIGS. 19a, 19b, 19c. The output signals IA, IB, IC are applied to a three-input multiplex circuit 134. The output signals of the multiplex circuit 134 are applied to a parallel-serial converter 135, which is controlled by the clock signal $c12^x$ The decoding circuit 57 further comprises a boundary-detection circuit (see FIG. 18a), which derives from the signals Ac1, Ac2, Ac3 and c1, ..., c9 whether the boundaries 140, 141, 142 between the signals indicated in FIG. 20 correspond to the boundaries between successive code words. The signal $g1=((Ac\bar{1}.Ac\bar{2}.Ac3)+AC3).((c\bar{1}.c\bar{2}.c3)+c1)$ indicates that the boundary 140 is a code-word boundary. The signal $g2=((c\bar{1}.c\bar{2}.c3)+c3)+((c\bar{4}.c5.c\bar{6})+c4)$ indicates whether the boundary 141 is a code-word boundary. The signal $g3=((c\bar{4}.c\bar{5}.c\bar{6})+c6).((c\bar{7}.c\bar{8}.c\bar{9})+c7)$ indicates the boundary 142 is a code-word boundary. By means of the gate circuit shown in FIG. 18b it is ascertained whether the signals c1, c2, c3 constitute a 3-bit code word. This is the case if the boundaries 140 and 141 are code-word boundaries. The signal SI2 = g1.g2 indicates that c1, c2, c3 constitute a 3-bit code word.

Figure 18C:
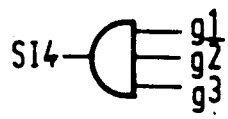

The circuit in FIG. 18c determines whether the signals c1, ..., c6 constitute a 6-bit code word. This is the case if the boundaries 140 and 142 are code-word boundaries and, moreover, the boundary 141 is not a code-word boundary. The signal $SI4=g1.g3.\overline{g2}$ indicates that c1, ...,c6 constitute a 6-bit code word.

Figure 18D:
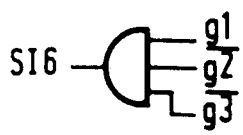

The circuit in FIG. 18d determines whether the signals c1, ..., c9 constitute a 9-bit code word. This is the case if the boundary 140 is a code-word boundary and the boundaries 141 and 142 are not. The signal $Si6=g1.g2.g3$ indicates that the signals c2, ...., c9 constitute a 9-bit code word. The signals SI2, SI4 and SI6 are applied to an OR gate 136. The output signal of the OR gate 136 is applied to a three-input AND gate 137. The signal S2 and the clock signal $c13^x$ are applied to the other inputs of the AND gate 137. The output signal of the AND gate 137 is applied to the parallel-load input of the parallel-serial converter 135 as the parallel-load signal. The decoding circuit 57 further comprises AND gates 138 and 139 for inhibiting the supply of the signals $c12^x$ and c1 to the converters 130 and 135 respectively.

The decoding circuit shown in FIG. 18 operates as follows.

The bits of the code signal Vc are loaded serially into the converter 130. By means of the boundary-detector circuit shown in FIG. 18a and the circuits of FIGS. 18b, c and d it is ascertained whether a 3, 6 or 9-bit code word is to be converted. Depending on the length of the code word either the output signals IA of the memory 131 (for 3-bit code words), the output signals IB of the memory 132 (for 6-bit code words), or the output signals IC of the memory 133 (for 9-bit code words) are applied to the parallel-serial converter 135.

The memories 131, 132 and 133 are loaded with such look-up tables that they convert a 3-bit, 6-bit or 9-bit code word on the address input into the associated 2-bit, 4-bit or 6-bit subword of the information signal Vi. The subwords thus loaded into the parallel-serial converter 135 is read out serially under control of the clock signal $c12^x$. Once the entire subword has been read out, the parallel-serial converter is loaded with the next subword. Possible errors in the detected code signal can be detected by an additional counter controlled by the clock signal $c13^x$ which is set to zero after every block-boundary detection and which supplies an error-detection signal if the count "3" is reached and, moreover, no code-word boundary has been detected yet. The encoding and decoding circuits shown in FIGS. 17 and 18 are constructed as hardware circuits. It is obvious that such encoding and decoding can also be performed by means of a programmable circuit, for example a microcomputer. If, as for example in the code words shown in FIG. 16, Q is greater than the number of bits of the smallest code words that occurs, the detection criteria for determining the code word boundaries, for which it is ascertained whether the bit sequence for the potential code-word boundary ends with Q-1 logic "1" bits or ends with a logic "1" bit and, moreover, the bit sequence after the potential code-word boundary begins with Q-1 logic "0" bits or begins with one logic "1" bit, cannot readily be applied.

The boundaries between a sequence of successive code words of the group shown in FIG. 16 can be determined as follows. After detection of a boundary between code words, a counter is set to zero. Subsequently, the potential boundary two bit positions further in the bit sequence of successive code words is tested for its validity. Moreover, upon every new test for the potential boundary (i.e. after every shift by two bits) the counter is incremented by one. For the count 1 or 2 it is ascertained whether the last bit for the potential code-word boundary is a logic "1" bit. In the case of a positive result of the test the potential boundary is accepted as a code-word boundary. In the case of a negative result the potential boundary is rejected. For the count 3 the two bits now following the potential boundary are also tested. If two bits constitute a "01" combination the potential boundary is rejected. For the count 4 the potential boundary is always accepted.

As is apparent from the foregoing, the ratio between the number of code bits and the number of information bits in synchronous coding is always constant, regardless of the bit pattern of the information signal, so that the storage capacity on the record carrier required for every information signal of a specific length is always the same, which is very important in storage systems.

Moreover, control of the conversion in the case of synchronous code can be realized simply, because the ratio between the read-in frequency and the read-out frequency during conversion can remain constant.

In the embodiments described in the foregoing the decision level required for decoding is always derived from the detection signal during scanning of the reference marks. However, it is to be noted that if the disc parameters, in particular the reflection coefficient, remain sufficiently constant a predetermined constant decision level may be adapted.

What is claimed is:

1. A method of optically recording information on an optical record carrier, in which an information signal is converted into a code signal comprising code words constituting bits, the number of successive bits of a fist logic value being at least equal to P and groups of at least P bits of a first logic value within each code word being separated by at least Q successive bits of a second logic value, P being an integer greater than or equal to 1 and Q being an integer greater than P, the method forming a pattern of recording marks corresponding to the code signal on the record carrier, the recording marks representing the bits of the first logic value, the number of bits of the first logic value is code-word dependent, and the number of successive bits of the first logic value is not constant for all of the code words.

2. A method as claimed in claim 1, in which the information signal is a signal comprising a sequence of m-bit information words, characterized in that each information signal of a first group is converted into a unique n-bit code word, m and n being selected in such a way that the number of available n-bit code words is smaller than the number of the possible m-bit information words, and in that n-bit information words not belonging to the first group are combined with at least one adjacent m-bit information word to form r×m-bit information words, r being an integer, which the r×m-bit information words are converted into the unique (r×m)-bit code words.

3. A method as claimed in claim 1, characterized in that the record carrier is provided with a preformed pattern of information tracks, the information track being provided with control signals which can be distinguished from the pattern of recording marks to be formed, the reference marks being arranged at predetermined positions relative to the control symbols.

4. A method as claimed in claim 1, further characterized in that each code word begins with P bits of the first logic value or beings with the Q bits of the second logic value, and in that each code word ends with P bits of the first logic value or ends with Q bits of the second logic value.

5. A method as claimed in claim 4, in which the information signal is a signal comprising a sequence of m-bit information words, characterized in that each information signal of a first group is converted into a unique n-bit code word, m and n being selected in such a way that the number of available n-bit code words is smaller than the number of the possible m-bit information words, and in that n-bit information words not belonging to the first group are combined with at least one adjacent m-bit information word to form (r×m)-bit information words, r being an integer, which the (Rxm)-bit information words are converted into the unique (r×m) bit code words.

6. A device as claimed in claim 5, in which the record carrier is of a type in which detectable control symbols are arranged in the information track, which symbols can be distinguished from the pattern of recording marks formed, which device is characterized in that device comprises means for detecting the instants at which the control symbol pass the write means and the device further comprising means for interrupting the formation of the code symbols in response to the detection of the instants of passage of the control symbols and for generating said control signals for the formation of the reference marks.

7. A method as claimed in claim 1, further characterized in that at retraceable positions on the record carrier and outside of the area used for information recording freely situated reference marks of the same type as the recording marks are formed.

8. A method as claimed in claim 7, characterized in that the record carrier is provided with a preformed pattern of information tracks, the information track being provided with control signals which cane distinguished from the pattern of recording marks to be formed, the reference marks being arranged at predetermined positions relative to the control symbols.

9. A device as claimed in claim 8, characterized in that the encoding circuit is adapted to generate code words which belong to a group for which each code word either beings with P bits of the first logic value or with Q bits of the second logic value and for which, in addition, each code word either ends with P bits of the first logic value or with Q bits of the second logic value.

10. A device as claimed in claim 9, characterized in that the information signal comprises a sequence of m-bit information words, the encoding circuit comprising detection means for detecting whether an m-bit information word belongs to a first group of informing words, and means responsive to a detection of such a m-bit information word to convert said information word into an n-bit code word, m and n being selected in such a way that the number of available of n-bit code words is smaller than the number of possible m-bit information words, the encoding circuit further comprising means for combining an m-bit information word not belonging to the first group with at least one directly adjoining m-bit information word of the sequence, to form an r×m-bit information word, where r is n integer greater than or equal to two, and the conversion circuit further comprising means for converting the generated r×m-bit information word into an rxn-bit code word.

11. A device as claimed in claim 9, characterized in that the device comprises means for temporarily interrupting the formation of code symbols and means for generating during said interruption the control signals for the write means, in order to form reference marks which are situated freely relative to the code symbols.

12. A device as claimed in claim 11, in which the record carrier is of a type in which detectable control symbols are arranged in the information track, which symbols can be distinguished from the pattern of recording marks formed, which device is characterized in that device comprises means for detecting the instants at which the control symbol pass the write means and the device further comprising means for interrupting the formation of the code symbols in response to the detection of the instants of passage of he control symbols and for generating said control signals for the formation of the reference marks.

13. A method according to claim 1, wherein the number of bits in each code word is constant.

14. A device for optically recording information on an optical record carrier, which device comprises an encoding circuit for converging an information signal into a binary code signal made up of code words, the number of successive bits of a first logic value in each code word being at least P and groups of at least P bits of the first logic value being separated by at least Q successive bits of a second logic value, P being an integer greater than or equal to 1 and Q being an integer greater than P, the device further comprising drive means for moving the optical record carrier relative to the write means, the write means being adapted to form an elementary mark on the record carrier in response to a code-signal bit of the first logic value, characterized in that the encoding circuit is adapted to generate code words comprising a variable number of bits of the first logic value so that the number of successive bits of the first logic value is not constant for all of the code words.

15. A device for reading a record carrier on which an encoded information signal is recorded as a pattern of recording marks, which device comprises read means for scanning the pattern and for generating a detecting signal which is representative of the pattern being scanned, means for converting the detection signal into a code signal comprising groups of n-bit code words, and a decoding circuit for converting the code signal into an information signal, characterized in that the device comprises means for generating rxn-bit information words, r being a variable integer greater than or equal to one, the decoding circuit comprises detection means for determining, in order to detect the boundaries between the code words, whether in two successive n-bit groups the last n-bit group begins either with P bits of the first logic value or with Q bits of the second logic value and, in addition, whether the first group of the successive groups either ends with P bits of the first logic value or begins with Q bits of the second logic value, and means for converting the r×m-bit information words.

16. An optical record carrier provided with an information track in which information is optically recorded as an information pattern of recording marks, the information pattern comprising code symbols, which represent code words, which code symbols occupy substantially equidistant symbol positions, a number of said positions being occupied by a recording mark, the number of successive symbol positions occupied being at least equal to P and the number of non-occupied successive symbol positions within the code symbols which are situated between the group of occupied symbol positions being at least equal to Q, P being an integer greater than or equal to one and Q being greater than P, each code word beginning with P bits of the first logic value or begins with Q bits of the second logic value, each code word ending with P bits of the first logic value or ending with Q bits of the second logic value, and the number of successive bits of the first logic value is not constant for all of the code words.

* * * * *